(12) United States Patent
Bhattad et al.

(10) Patent No.: US 11,071,133 B2
(45) Date of Patent: Jul. 20, 2021

(54) CROSS-LINK INTERFERENCE DETECTION AND MITIGATION

(71) Applicant: QUALCOMM Incorporated, San Diego, CA (US)

(72) Inventors: Kapil Bhattad, Bangalore (IN); Ananta Narayanan Thyagarajan, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/282,121

(22) Filed: Feb. 21, 2019

(65) Prior Publication Data

US 2019/0274155 A1 Sep. 5, 2019

Related U.S. Application Data

(60) Provisional application No. 62/638,709, filed on Mar. 5, 2018.

(51) Int. Cl.
*H04W 4/00* (2018.01)
*H04W 72/12* (2009.01)
(Continued)

(52) U.S. Cl.
CPC ....... *H04W 72/1273* (2013.01); *H04L 5/0037* (2013.01); *H04L 5/0048* (2013.01);
(Continued)

(58) Field of Classification Search
None
See application file for complete search history.

(56) References Cited

U.S. PATENT DOCUMENTS

| 2015/0288505 A1* | 10/2015 | Park | H04L 5/0091 370/336 |
| 2015/0382222 A1* | 12/2015 | Park | H04L 1/00 370/252 |

(Continued)

OTHER PUBLICATIONS

Huawei, et al: "UE-to-UE Measurement for Cross-link Interference Mitigation," 3GPP Draft; R1-1801798, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397772, 14 pages, Retrieved from the Internet: http://www.3gpp.org/ftp/tsg%5Fran/WG1%5FRL1/TSGR1%5F92/Docs/ [retrieved on Feb. 17, 2018] section 2.1.

(Continued)

*Primary Examiner* — Phuongchau Ba Nguyen
(74) *Attorney, Agent, or Firm* — Qualcomm Incorporated

(57) ABSTRACT

In some aspects, a wireless node, such as a user equipment (UE), may measure a reference signal (RS) on a first group of RS resource sets, wherein each RS resource set in the first group of RS resource sets is associated with a different set of wireless nodes; may detect interference on a first RS resource set in the first group of RS resource sets, wherein the first RS resource set is associated with a first set of wireless nodes; and may measure RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes.

28 Claims, 16 Drawing Sheets

(51) Int. Cl.
*H04W 24/10* (2009.01)
*H04W 24/08* (2009.01)
*H04L 5/00* (2006.01)

(52) U.S. Cl.
CPC ........... *H04L 5/0073* (2013.01); *H04W 24/08* (2013.01); *H04W 24/10* (2013.01)

(56) References Cited

U.S. PATENT DOCUMENTS

2016/0301505 A1* 10/2016 Furuskog ............. H04B 7/0452
2019/0174466 A1* 6/2019 Zhang ..................... H04L 5/005

OTHER PUBLICATIONS

International Search Report and Written Opinion—PCT/US2019/019236—ISA/EPO—dated May 29, 2019.

Nokia, et al: "On Cross-link Interference Measurement Framework," 3GPP Draft; R1-1715747 on Cross-Link Interference Measurement Framework, 3rd Generation Partnership Project (3GPP), Mobile Competence Centre; 650, Route Des Lucioles; F-06921 Sophia-Antipolis Cedex, vol. RAN WG1, No. Nagoya, Japan; Sep. 18, 2017-Sep. 21, 2017, Sep. 17, 2017, XP051339209, 6 pages, Retrieved from the Internet: URL: http://www.3gpp.org/ftp/Meetings_3GPP_SYNC/RAN1/Docs/ [retrieved on Sep. 17, 2017] sections 1-3.

Vivo: "Details of UE-UE CLI Measurements," 3GPP Draft; R1-1715649_Details of UE-UE CLI Measurements, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339115, 4 pages, Retrieved from the Internet: URL: http://www.3gpp.org/ftp/Meetings_3GPP_SYNC/RAN1/Docs/ [retrieved on Sep. 17, 2017] section 2.2.

* cited by examiner

CROSS-LINK INTERFERENCE DETECTION AND MITIGATION

CROSS-REFERENCE TO RELATED APPLICATIONS UNDER 35 U.S.C. § 119

This application claims priority to U.S. Provisional Patent Application No. 62/638,709, filed on Mar. 5, 2018, entitled "TECHNIQUES AND APPARATUSES FOR CROSS-LINK INTERFERENCE DETECTION AND MITIGATION," which is hereby expressly incorporated by reference herein.

FIELD OF THE DISCLOSURE

Aspects of the present disclosure generally relate to wireless communication, and more particularly to techniques and apparatuses for cross-link interference detection and mitigation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless node (e.g., a UE or a base station), may include measuring a reference signal (RS) on a first group of RS resource sets, wherein each RS resource set in the first group of RS resource sets is associated with a different set of wireless nodes; detecting interference on a first RS resource set in the first group of RS resource sets based at least in part on measuring the RS, wherein the first RS resource set is associated with a first set of wireless nodes; and measuring an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes.

In some aspects, a wireless node for wireless communication may include memory and one or more processors operatively coupled to the memory. The memory and the one or more processors may be configured to measure a reference signal (RS) on a first group of RS resource sets, wherein each RS resource set in the first group of RS resource sets is associated with a different set of wireless nodes; detect interference on a first RS resource set in the first group of RS resource sets based at least in part on measuring the RS, wherein the first RS resource set is associated with a first set of wireless nodes; and measure an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes.

In some aspects, a non-transitory computer-readable medium may store one or more instructions for wireless communication. The one or more instructions, when executed by one or more processors of a wireless node, may cause the one or more processors to measure a sounding reference signal (RS) on a first group of RS resource sets, wherein each RS resource set in the first group of RS resource sets is associated with a different set of wireless nodes; detect interference on a first RS resource set in the first group of RS resource sets based at least in part on measuring the RS, wherein the first RS resource set is associated with a first set of wireless nodes; and measure an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes.

In some aspects, an apparatus for wireless communication may include means for measuring a sounding reference signal (RS) on a first group of RS resource sets, wherein each RS resource set in the first group of RS resource sets is associated with a different set of wireless nodes; means for detecting interference on a first RS resource set in the first group of RS resource sets based at least in part on measuring the RS, wherein the first RS resource set is associated with a first set of wireless nodes; and means for measuring an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes.

In some aspects, a method of wireless communication, performed by a base station, may include transmitting an indication of a first group of RS resource sets to be used by a first wireless node to measure an RS, wherein each RS resource set in the first group of RS resource sets is associated with a set of wireless nodes of a neighbor base station; transmitting an indication of a second group of RS resource sets to be used by the first wireless node to measure an RS, wherein each RS resource set of the second group of RS resource sets is associated with a subset of the set of wireless nodes; and receiving an indication of a second wireless node or an RS resource set associated with interference based at least in part on transmitting the indication of the second group of RS resource sets, wherein the second wireless node is included in a subset of the set of wireless nodes.

In some aspects, a base station for wireless communication may include memory and one or more processors operatively coupled to the memory. The memory and the one or more processors may be configured to transmit an indication of a first group of sounding reference signal (RS) resource sets to be used by a first wireless node to measure an RS, wherein each RS resource set in the first group of RS resource sets is associated with a set of wireless nodes of a neighbor base station; transmit an indication of a second group of RS resource sets to be used by the first wireless node to measure an RS, wherein each RS resource set of the second group of RS resource sets is associated with a subset of the set of wireless nodes; and receive an indication of a second wireless node or an RS resource set associated with interference based at least in part on transmitting the indication of the second group of RS resource sets, wherein the second wireless node is included in a subset of the set of wireless nodes.

In some aspects, a non-transitory computer-readable medium may store one or more instructions for wireless communication. The one or more instructions, when executed by one or more processors of a base station, may cause the one or more processors to transmit an indication of a first group of sounding reference signal (RS) resource sets to be used by a first wireless node to measure an RS, wherein each RS resource set in the first group of RS resource sets is associated with a set of wireless nodes of a neighbor base station; transmit an indication of a second group of RS resource sets to be used by the first wireless node to measure an RS, wherein each RS resource set of the second group of RS resource sets is associated with a subset of the set of wireless nodes; and receive an indication of a second wireless node or an RS resource set associated with interference based at least in part on transmitting the indication of the second group of RS resource sets, wherein the second wireless node is included in a subset of the set of wireless nodes.

In some aspects, an apparatus for wireless communication may include means for transmitting an indication of a first group of sounding reference signal (RS) resource sets to be used by a first wireless node to measure an RS, wherein each RS resource set in the first group of RS resource sets is associated with a set of wireless nodes of a neighbor base station; means for transmitting an indication of a second group of RS resource sets to be used by the first wireless node to measure an RS, wherein each RS resource set of the second group of RS resource sets is associated with a subset of the set of wireless nodes; and means for receiving an indication of a second wireless node or an RS resource set associated with interference based at least in part on transmitting the indication of the second group of RS resource sets, wherein the second wireless node is included in a subset of the set of wireless nodes.

In some aspects, a method of wireless communication, performed by a wireless node, may include receiving an RS configuration that indicates a first RS resource set and a second RS resource set for transmission of RS, wherein the first RS resource set is included in a first group of RS resource sets to be used by multiple wireless nodes of a base station to transmit RS, and wherein the second RS resource set is included in a second group of RS resource sets to be used by a subset of the multiple wireless nodes to transmit the RS; transmitting a first RS on the first RS resource set; and transmitting a second RS on the second RS resource set.

In some aspects, a wireless node for wireless communication may include memory and one or more processors operatively coupled to the memory. The memory and the one or more processors may be configured to receive a sounding reference signal (RS) configuration that indicates a first RS resource set and a second RS resource set for transmission of RS, wherein the first RS resource set is included in a first group of RS resource sets to be used by multiple wireless nodes of a base station to transmit RS, and wherein the second RS resource set is included in a second group of RS resource sets to be used by a subset of the multiple wireless nodes to transmit the RS; transmit a first RS on the first RS resource set; and transmit a second RS on the second RS resource set.

In some aspects, a non-transitory computer-readable medium may store one or more instructions for wireless communication. The one or more instructions, when executed by one or more processors of a wireless node, may cause the one or more processors to receive a sounding reference signal (RS) configuration that indicates a first RS resource set and a second RS resource set for transmission of RS, wherein the first RS resource set is included in a first group of RS resource sets to be used by multiple wireless nodes of a base station to transmit RS, and wherein the second RS resource set is included in a second group of RS resource sets to be used by a subset of the multiple wireless nodes to transmit the RS; transmit a first RS on the first RS resource set; and transmit a second RS on the second RS resource set.

In some aspects, an apparatus for wireless communication may include means for receiving a sounding reference signal (RS) configuration that indicates a first RS resource set and a second RS resource set for transmission of RS, wherein the first RS resource set is included in a first group of RS resource sets to be used by multiple wireless nodes of a base station to transmit RS, and wherein the second RS resource set is included in a second group of RS resource sets to be used by a subset of the multiple wireless nodes to transmit the RS; means for transmitting a first RS on the first RS resource set; and means for transmitting a second RS on the second RS resource set.

In some aspects, a method of wireless communication, performed by a base station, may include transmitting an indication of a first RS resource set to be used by a wireless node to transmit a first RS, wherein the first RS resource set is included in a first group of RS resource sets to be used by multiple wireless nodes of the base station to transmit RS; and transmitting an indication of a second RS resource set to be used by the wireless node to transmit a second RS, wherein the second RS resource set is included in a second group of RS resource sets to be used by a subset of the multiple wireless nodes to transmit RS, wherein the subset of the multiple wireless nodes is associated with the first RS resource set.

In some aspects, a base station for wireless communication may include memory and one or more processors operatively coupled to the memory. The memory and the one or more processors may be configured to transmit an indication of a first sounding reference signal (RS) resource set to be used by a wireless node to transmit a first RS, wherein the first RS resource set is included in a first group of RS resource sets to be used by multiple wireless nodes of the base station to transmit RS; and transmit an indication of a second RS resource set to be used by the wireless node to transmit a second RS, wherein the second RS resource set is included in a second group of RS resource sets to be used by a subset of the multiple wireless nodes to transmit RS, wherein the subset of the multiple wireless nodes is associated with the first RS resource set.

In some aspects, a non-transitory computer-readable medium may store one or more instructions for wireless communication. The one or more instructions, when executed by one or more processors of a base station, may cause the one or more processors to transmit an indication of a first sounding reference signal (RS) resource set to be used by a wireless node to transmit a first RS, wherein the first RS resource set is included in a first group of RS resource sets to be used by multiple wireless nodes of the base station to transmit RS; and transmit an indication of a second RS resource set to be used by the wireless node to transmit a second RS, wherein the second RS resource set is included in a second group of RS resource sets to be used by a subset of the multiple wireless nodes to transmit RS, wherein the subset of the multiple wireless nodes is associated with the first RS resource set.

In some aspects, an apparatus for wireless communication may include means for transmitting an indication of a first sounding reference signal (RS) resource set to be used by a wireless node to transmit a first RS, wherein the first RS resource set is included in a first group of RS resource sets to be used by multiple wireless nodes of the apparatus to transmit RS; and means for transmitting an indication of a second RS resource set to be used by the wireless node to transmit a second RS, wherein the second RS resource set is included in a second group of RS resource sets to be used by a subset of the multiple wireless nodes to transmit RS, wherein the subset of the multiple wireless nodes is associated with the first RS resource set.

In some aspects, a method of wireless communication, performed by a wireless node, may include receiving a reference signal configuration that is common for multiple wireless nodes, wherein the reference signal configuration indicates a default number of ports to use for transmission of a reference signal; determining a number of ports to be used for transmission of the reference signal based at least in part on the default number of ports and a port configuration for the wireless node; and transmitting the reference signal using the determined number of ports.

In some aspects, a wireless node for wireless communication may include memory and one or more processors operatively coupled to the memory. The memory and the one or more processors may be configured to receive a reference signal configuration that is common for multiple wireless nodes, wherein the reference signal configuration indicates a default number of ports to use for transmission of a reference signal; determine a number of ports to be used for transmission of the reference signal based at least in part on the default number of ports and a port configuration for the wireless node; and transmit the reference signal using the determined number of ports.

In some aspects, a non-transitory computer-readable medium may store one or more instructions for wireless communication. The one or more instructions, when executed by one or more processors of a wireless node, may cause the one or more processors to receive a reference signal configuration that is common for multiple wireless nodes, wherein the reference signal configuration indicates a default number of ports to use for transmission of a reference signal; determine a number of ports to be used for transmission of the reference signal based at least in part on the default number of ports and a port configuration for the wireless node; and transmit the reference signal using the determined number of ports.

In some aspects, an apparatus for wireless communication may include means for receiving a reference signal configuration that is common for multiple wireless nodes, wherein the reference signal configuration indicates a default number of ports to use for transmission of a reference signal; means for determining a number of ports to be used for transmission of the reference signal based at least in part on the default number of ports and a port configuration for the apparatus; and means for transmitting the reference signal using the determined number of ports.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
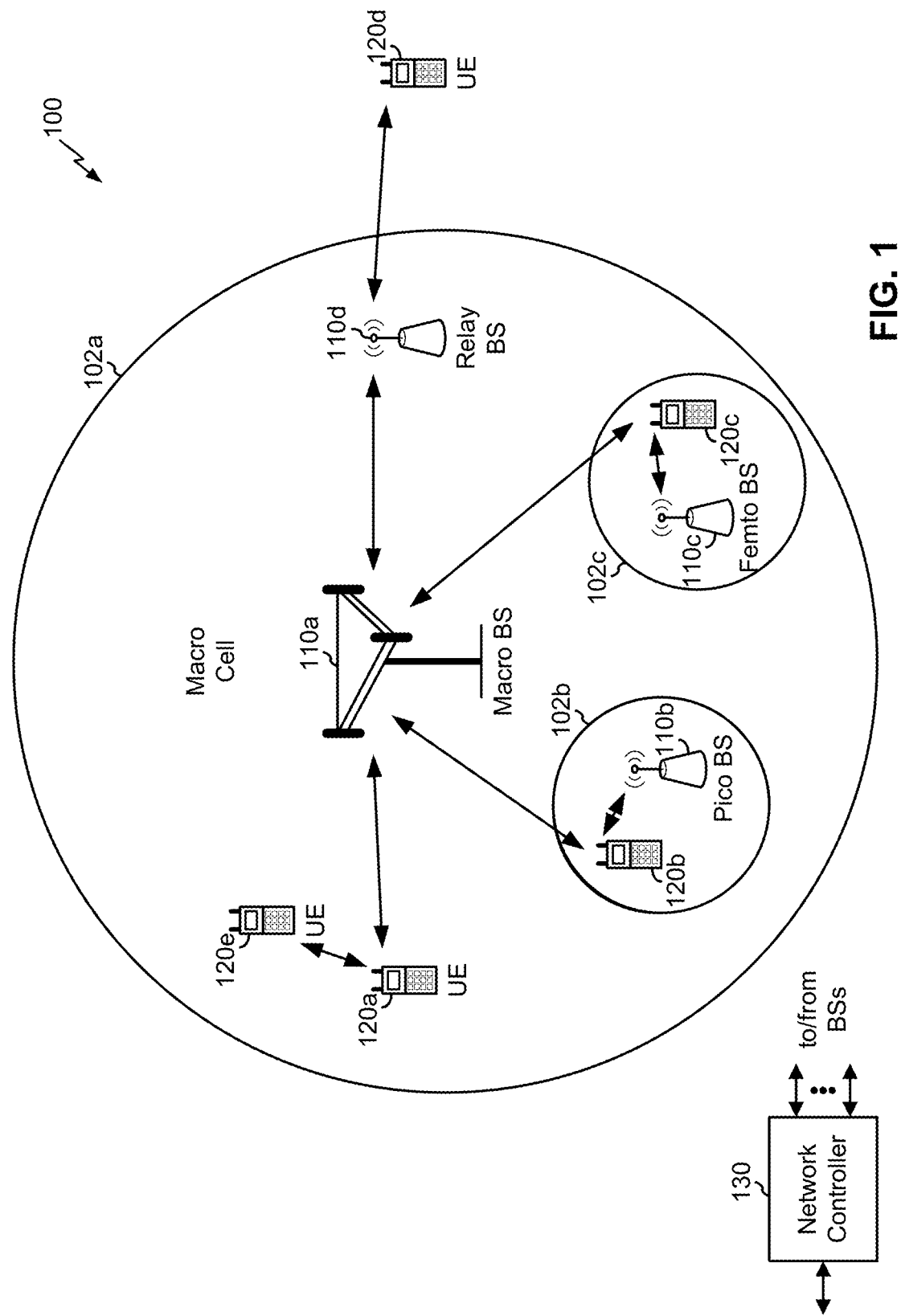
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node (e.g., a base station 110) may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
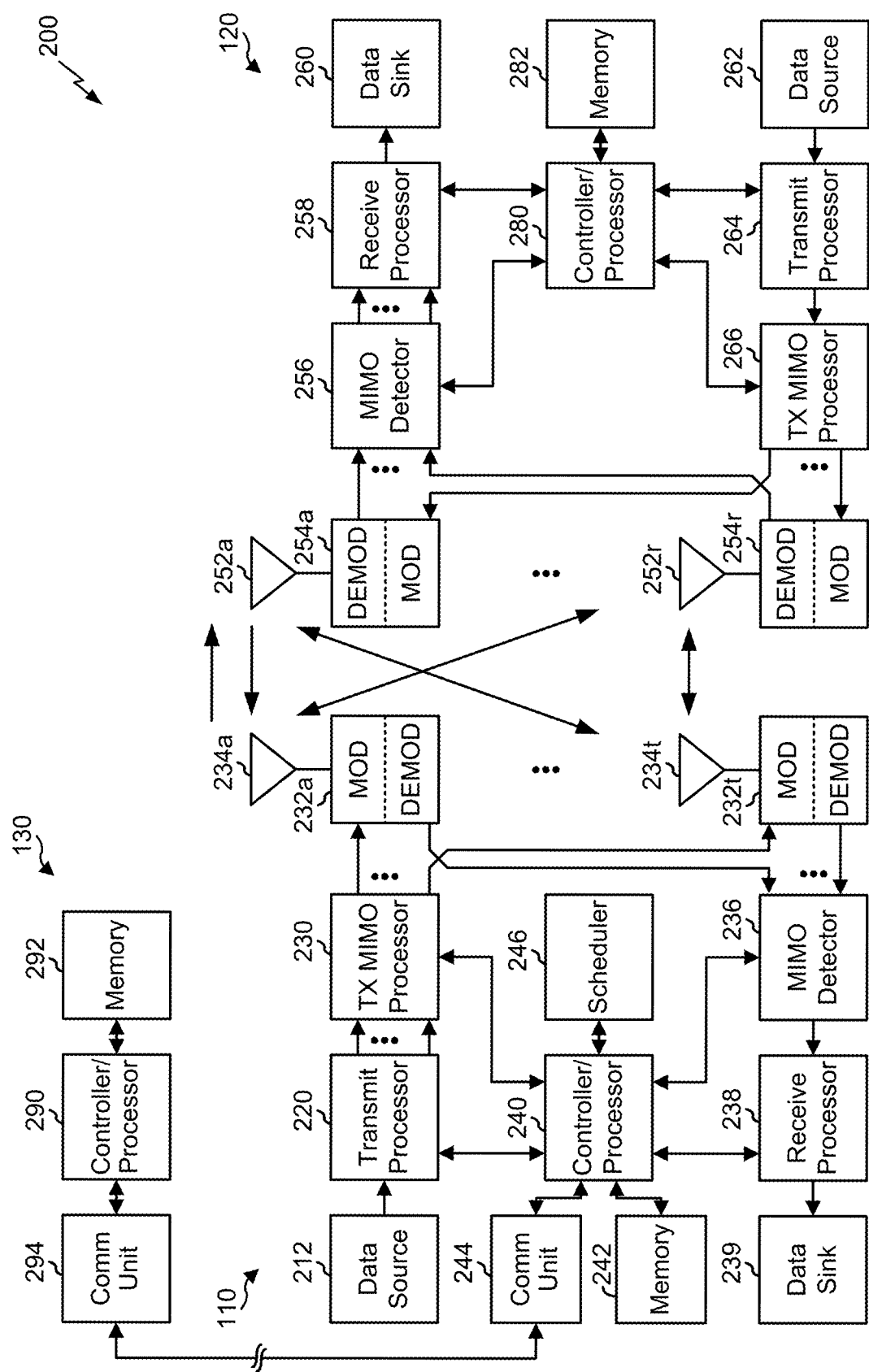
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., sounding reference signals or the like). The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with cross-link interference detection and mitigation, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. A scheduler 246 may schedule UEs for data transmission on the downlink and/or uplink.

In some aspects, a wireless node (e.g., base station 110 and/or UE 120) may include means for measuring a reference signal (RS) (e.g., an SRS) on a first group of RS resource sets, wherein each RS resource set in the first group of RS resource sets is associated with a different set of wireless nodes (e.g., UEs when the wireless node is a UE or base stations when the wireless node is a base station); means for detecting interference on a first RS resource set in the first group of RS resource sets based at least in part on measuring the RS, wherein the first RS resource set is associated with a first set of wireless nodes; means for measuring an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes; and/or the like. Additionally, or alternatively, a wireless node (e.g., base station 110 and/or UE 120) may include means for receiving a reference signal (RS) configuration that indicates a first RS resource set and a second RS resource set for transmission of RS, wherein the first RS resource set is included in a first group of RS resource sets to be used by multiple wireless nodes to transmit RS, and wherein the second RS resource set is included in a second group of RS resource sets to be used by a subset of the multiple wireless nodes to transmit the RS; means for transmitting a first RS on the first RS resource set; means for transmitting a second RS on the second RS resource set; and/or the like. Additionally, or alternatively, UE 120 may include means for receiving a reference signal configuration that is common for multiple UEs, wherein the reference signal configuration indicates a default number of ports to use for transmission of a reference signal; means for determining a number of ports to be used for transmission of the reference signal based at least in part on the default number of ports and a port configuration for the UE; means for transmitting the reference signal using the determined number of ports; and/or the like. In some aspects, such means may include one or more components of UE 120 and/or base station 110 described in connection with FIG. 2.

In some aspects, base station 110 may include means for transmitting an indication of a first group of reference signal (RS) resource sets to be used by a first user equipment (UE) to measure an RS, wherein each RS resource set in the first group of RS resource sets is associated with a set of user equipment (UEs) of a neighbor base station; means for transmitting an indication of a second group of RS resource sets to be used by the first UE to measure an RS, wherein each RS resource set of the second group of RS resource sets is associated with a subset of the set of UEs; means for receiving an indication of a second UE or an RS resource set associated with interference based at least in part on transmitting the indication of the second group of RS resource sets, wherein the second UE is included in a subset of the set of UEs; and/or the like. Additionally, or alternatively, base station 110 may include means for transmitting an indication of a first reference signal (RS) resource set to be used by a user equipment (UE) to transmit a first RS, wherein the first RS resource set is included in a first group of RS resource sets to be used by multiple UEs of the base station to transmit RS; means for transmitting an indication of a second RS resource set to be used by the UE to transmit a second RS, wherein the second RS resource set is included in a second group of RS resource sets to be used by a subset of the multiple UEs to transmit RS, wherein the subset of the multiple UEs is associated with the first RS resource set; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
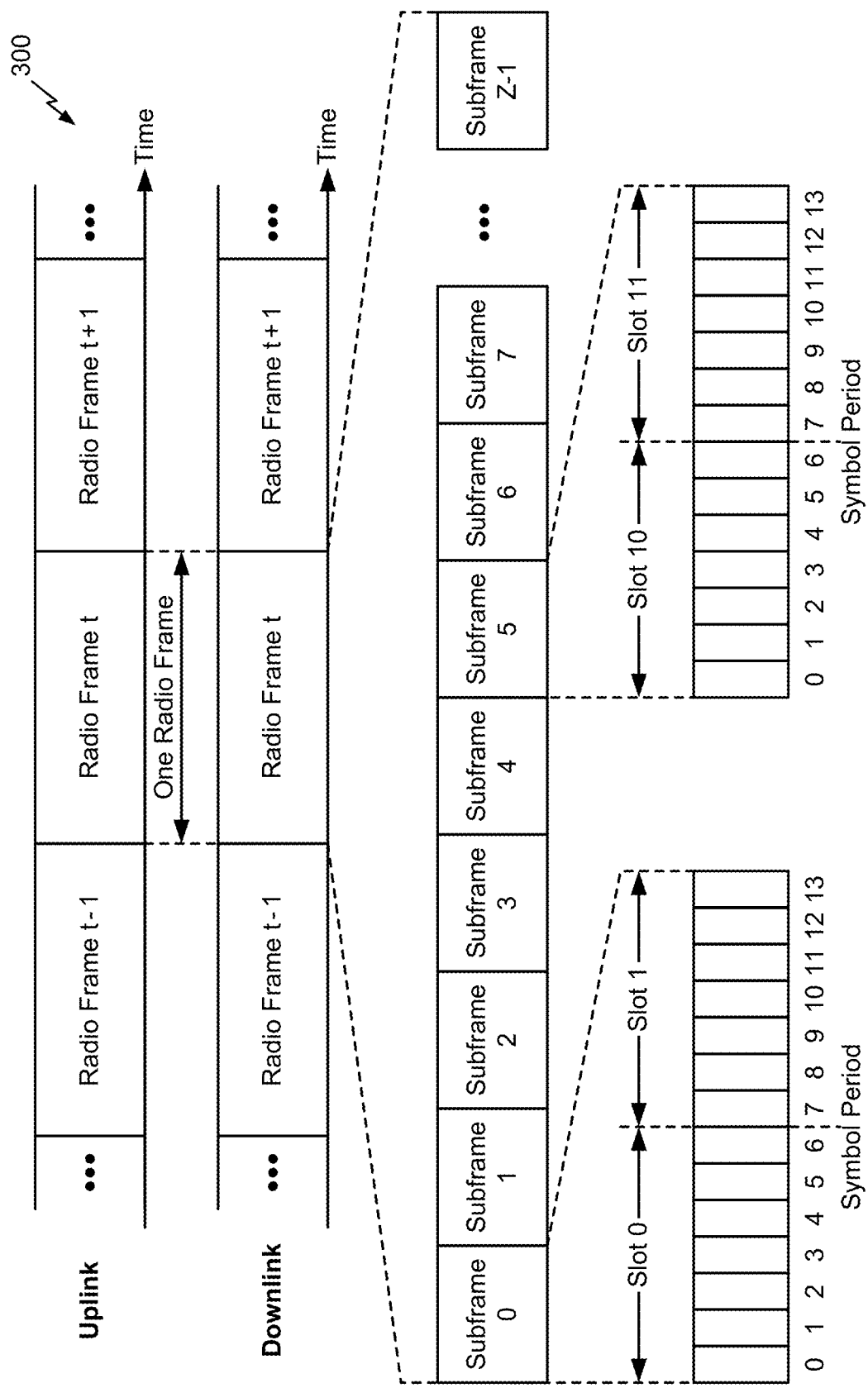
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
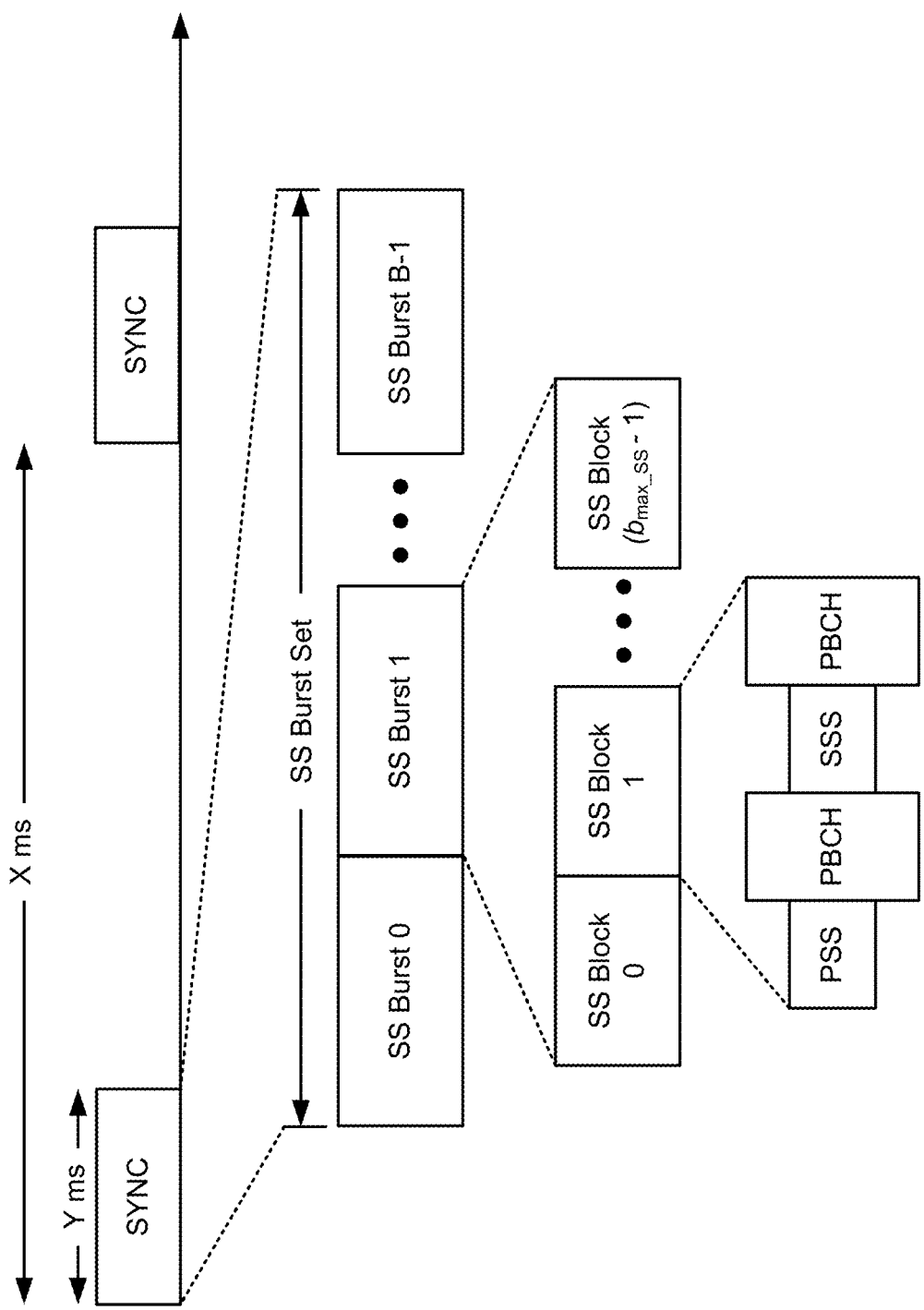
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node (e.g., a base station 110), such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIGS. 3A and 3B are provided as examples. Other examples are possible and may differ from what was described with regard to FIGS. 3A and 3B.

Figure 4:
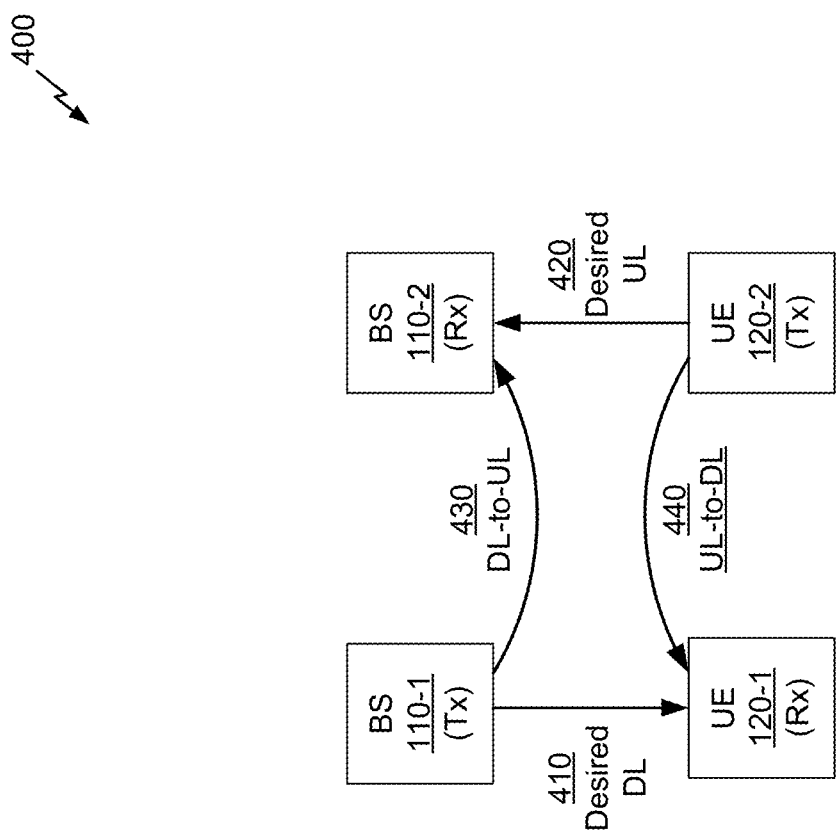
FIGS. 4-10 are diagrams illustrating examples relating to cross-link interference detection and mitigation, in accordance with various aspects of the present disclosure.

FIG. 4 is a diagram illustrating an example 400 relating to cross-link interference detection and mitigation, in accordance with various aspects of the present disclosure.

In dynamic time division duplexing (TDD), the allocation of network resources to uplink and downlink may be dynamically modified depending on a traffic load. For example, a base station 110 may configure a TDD configuration (e.g., a TDD pattern) with more uplink transmission time intervals (TTIs) (e.g., subframes, slots, and/or the like) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the base station 110 and the UE 120.

As shown in FIG. 4, when neighboring base stations 110 use different TDD configurations to communicate with UEs 120, this may result in a downlink communication 410 between a first base station 110-1 and a first UE 120-1 in a same TTI as an uplink communication 420 between a second base station 110-2 and a second UE 120-2. These communications in different transmission directions (e.g., downlink vs. uplink) in the same TTI may interfere with one another, which may be referred to as cross-link interference.

For example, as shown by reference number 430, the downlink communication 410 transmitted by the first base station 110-1 may be received by the second base station 110-2, and may interfere with reception, by the second base station 110-2, of the uplink communication 420 from the second UE 120-2. This may be referred to as downlink-to-uplink (DL-to-UL) interference, base station to base station interference, gNB to gNB interference, and/or the like.

Further, as shown by reference number 440, the uplink communication 420 transmitted by the second UE 120-2 may be received by the first UE 120-1, and may interfere with reception, by the first UE 120-1, of the downlink communication 410 from the first base station 110-1. This may be referred to as uplink-to-downlink (UL-to-DL) interference, UE to UE interference, and/or the like. This UE to UE interference may occur and/or may increase when the first UE 120-1 and the second UE 120-2 are in close proximity, and may be avoided or mitigated by preventing scheduling of the UEs 120 in different transmission directions in the same TTI.

Some techniques and apparatuses described herein assist with detecting UE to UE cross-link interference (e.g., using UE to UE reference signals, such as sounding reference signals), reporting such interference, and mitigating such interference. In this way, interference may be reduced, and network performance may be improved. Furthermore, some techniques and apparatuses described herein use a hierarchical reference signal (e.g., SRS) configuration to detect UE to UE interference, which may conserve UE resources (e.g., processing resources, memory resources, battery power, and/or the like) by allowing the UE 120 to measure a smaller number of SRS to identify an interfering UE 120, may conserve base station resources through fewer information exchanges, may conserve network resources (e.g., radio resources, over-the-air resources, and/or the like) through transmission of fewer SRS, and/or the like. Although some techniques are described herein in connection with SRS, other reference signals may be used in some aspects.

As indicated above, FIG. 4 is provided as an example. Other examples are possible and may differ from what was described with respect to FIG. 4.

Figure 5:
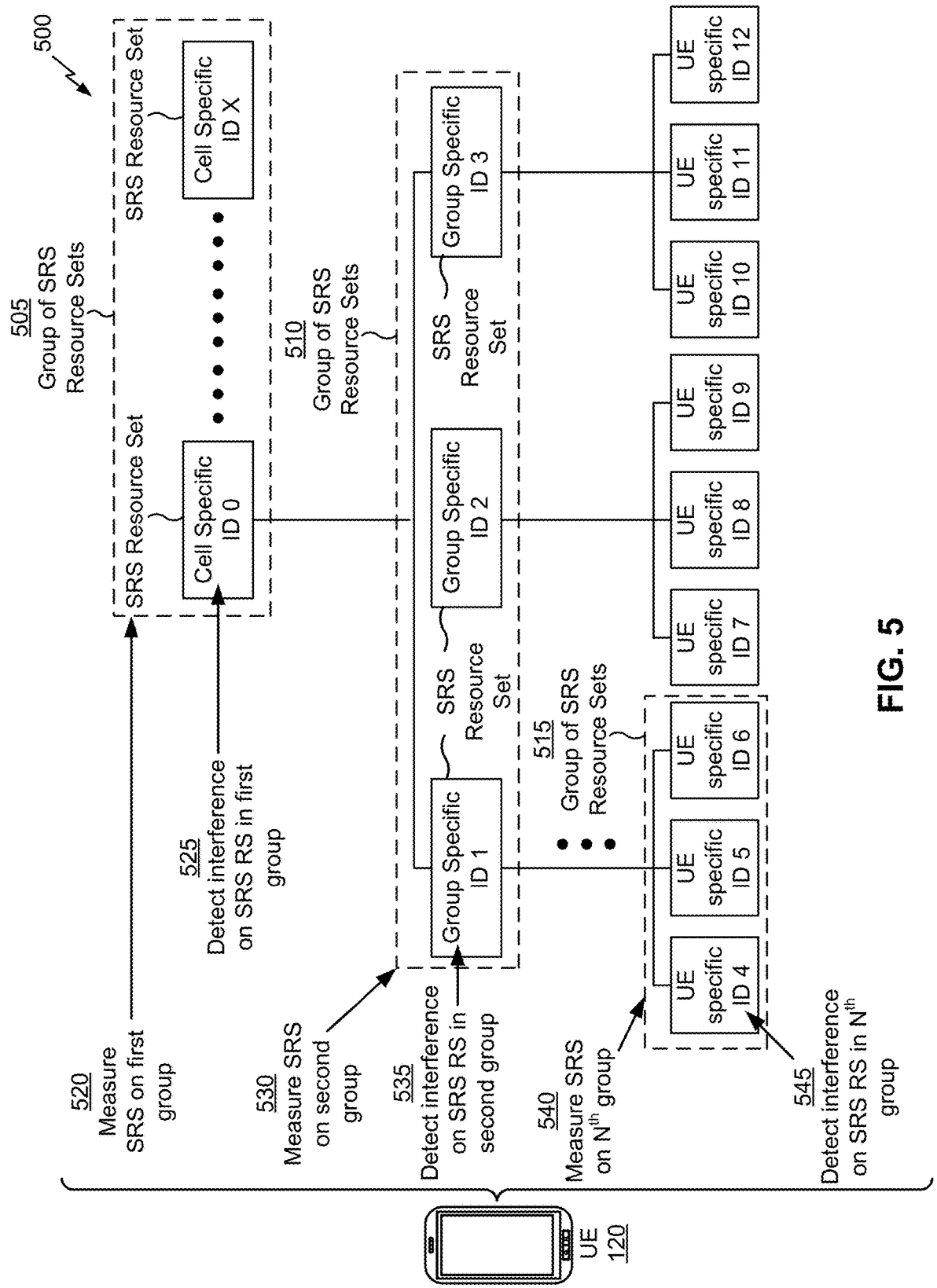

FIG. 5 is a diagram illustrating an example 500 relating to cross-link interference detection and mitigation, in accordance with various aspects of the present disclosure.

FIG. 5 shows an example hierarchical SRS configuration that may be used to assist with detecting UE to UE cross-link interference. As shown, the hierarchical SRS configuration may include multiple groups of SRS resource sets (sometimes referred to herein as a group for brevity), where each group of SRS resource sets includes multiple SRS resource sets. In some aspects, each SRS resource set included in a group of SRS resource sets may be associated with a different set of UEs 120. In some aspects, the sets of UEs 120 associated with different SRS resource sets in a group may be mutually exclusive, such that a single UE 120 is associated with only a single SRS resource set in a group. A group of SRS resource sets may be a parent group associated with a child group, and/or may be a child group associated with a parent group. In some aspects, all UEs 120 associated with a child group may also be associated with the parent group of that child group. Additionally, or alternatively, each UE 120 associated with a parent group may be associated with a single child group of that parent group.

A UE 120 associated with an SRS resource set may use that SRS resource set to transmit and/or receive SRS. An SRS resource set may include a configured number of SRS ports, a set of symbols, and a fixed number of orthogonal SRS resources (e.g., using different frequencies, combs, cyclic shifts, and/or the like), within each symbol, corresponding to each of the configured number of SRS ports for the SRS resource set. In some aspects, different SRS resource sets in different groups are transmitted and/or received at different times (e.g., do not overlap in time). Additionally, or alternatively, different SRS resource sets in the same group are transmitted and/or received at the same time. For example, different SRS resource sets in the same group may use different orthogonal SRS resources in a same set of symbols (e.g., a same set of time resources) and a same bandwidth part (e.g., same set of frequency resources).

As described in more detail below, an SRS resource set may be a cell-specific SRS resource set (e.g., associated with all UEs 120 in a cell and/or in communication with a base station 110), a UE group-specific SRS resource set (e.g., associated with multiple UEs 120 that includes fewer than all UEs 120 in a cell), a UE subgroup-specific SRS resource set (e.g., associated with a sub-group of the group of UEs 120), a UE-specific SRS resource set (e.g., associated with a single UE 120), and/or the like.

For example, as shown by reference number 505, the hierarchical SRS configuration may include a group of cell-specific SRS resource sets, which may include a first cell-specific SRS resource set (e.g., shown as Cell Specific ID 0) through an $X^{th}$ cell-specific SRS resources set ($X \geq 2$) (e.g., shown as Cell Specific ID X). A cell-specific SRS resource set may be associated with all UEs 120 connected to a cell and/or a base station 110, and may be used by those UEs 120 to transmit and/or receive SRS to assist with UE to UE cross-link interference detection and mitigation, as described in more detail elsewhere herein.

As shown by reference number 510, the hierarchical SRS configuration may include a group of group-specific SRS resource sets, which may include a first group-specific SRS resource set (e.g., shown as Group Specific ID 1), a second group-specific SRS resource set (e.g., shown as Group Specific ID 2), and a third group-specific SRS resource set (e.g., shown as Group Specific ID 3). In example 500, three group-specific SRS resource sets are shown as an example. In practice, the hierarchical SRS configuration may include a different number of group-specific SRS resource sets.

A group-specific SRS resource set may be associated with a subset of UEs 120 associated with the cell-specific SRS resource set that is a parent group of the group-specific SRS resource set. For example, a group-specific SRS resource set may be associated with fewer than all UEs 120 connected to a cell and/or a base station 110. In some aspects, each UE 120 in a cell may be associated with a single group-specific SRS resource set. A group-specific SRS resource set may be used by the UEs 120 associated with the group-specific SRS resource set to transmit and/or receive SRS (e.g., at a different time than other groups in the hierarchical SRS configuration, such as a parent group of cell-specific SRS resource sets, a child group of UE-specific SRS resource sets, and/or the like), as described in more detail elsewhere herein.

As shown by reference number 515, the hierarchical SRS configuration may include a group of UE-specific SRS resource sets, which may include a first UE-specific SRS resource set (e.g., shown as UE Specific ID 4), a second UE-specific SRS resource set (e.g., shown as UE Specific ID 5), and a third UE-specific SRS resource set (e.g., shown as UE Specific ID 6). In example 500, three UE-specific SRS resource sets are shown per parent SRS resource set as an example. In practice, the hierarchical SRS configuration may include a different number of UE-specific SRS resource sets per parent SRS resource set. Additionally, or alternatively, different groups of UE-specific SRS resource sets may include different numbers of UE-specific SRS resource sets (e.g., three in a first group, four in a second group, and/or the like).

A UE-specific SRS resource set may be associated with a single UE 120. The single UE 120 may be associated with the group-specific SRS resource set that is a parent group of the UE-specific SRS resource set. In some aspects, each UE 120 in a cell may be associated with a single UE-specific SRS resource set. A UE-specific SRS resource set may be used by the UE 120 associated with the UE-specific SRS resource set to transmit and/or receive SRS (e.g., at a different time than other groups in the hierarchical SRS configuration, such as a parent group of group-specific SRS resource sets, a grandparent group of cell-specific SRS resource sets, and/or the like), as described in more detail elsewhere herein.

In example 500, three groups of SRS resource sets (e.g., a cell-specific group, a group-specific group, and a UE-specific group) are shown as an example. In practice, the hierarchical SRS configuration may include a different number of groups (e.g., two groups, four groups, five groups, and/or the like). Additionally, or alternatively, different types of groups of SRS resource sets may be included in the hierarchical SRS configuration (e.g., a subgroup-specific group, a sub-subgroup-specific group, and/or the like). Additionally, or alternatively, a highest level or group of the hierarchical SRS configuration (e.g., a group or resource set without a parent) may have a finer granularity than a cell-specific group. For example, the highest level or group of the hierarchical SRS configuration may be a group-specific group. Additionally, or alternatively, a lowest level or group of the hierarchical SRS configuration (e.g., a group or resource set without a child) may have a coarser granularity than a UE-specific group. For example, the lowest level or group of the hierarchical SRS configuration may be a subgroup-specific group.

As shown by reference number 520, a UE 120 may measure SRS on a first group of SRS resource sets. For example, the UE 120 may measure SRS on a group of cell-specific SRS resource sets, as shown. In some aspects, each cell-specific SRS resource set may correspond to a different neighbor base station 110 and/or neighbor cell, and may be associated with UEs 120 of that neighbor base station 110 and/or neighbor cell. In some aspects, the UE 120 may measure SRS on each cell-specific SRS resource set, included in the group of SRS resource sets, at the same time (e.g., using a same set of time resources), thereby conserving resources that would otherwise be consumed by measuring different SRS at different times.

In some aspects, the UE 120 may measure the SRS based at least in part on an explicit indication (e.g., from a base station 110) to activate SRS measurements for the hierarchical SRS configuration. Additionally, or alternatively, the UE 120 may measure the SRS based at least in part on a triggering event, such as detecting interference (e.g., due to poor channel conditions, transmitting or receiving a threshold number of negative acknowledgements, and/or the like). In some aspects, the UE 120 may continuously (e.g., periodically) measure the SRS (e.g., without an explicit indication or a triggering event). Additionally, or alternatively, different techniques (e.g., continuous monitoring, explicit indication, triggering event, and/or the like) may be used for different levels of the hierarchical SRS configuration.

As shown by reference number 525, the UE 120 may detect interference on a first SRS resource set included in the first group of SRS resource sets. The UE 120 may detect the interference based at least in part on measuring the SRS on the first group of SRS resource sets. For example, the UE 120 may measure SRS on one or more ports and/or one or more symbols associated with the first group of SRS resource sets. Based at least in part on measuring the SRS, the UE 120 may determine that a measured parameter (e.g., an energy level, a power level, an RSRP parameter, an RSSI parameter, and/or the like), on one or more SRS resources, satisfies a threshold. The one or more SRS resources may be associated with the first SRS resource set (e.g., where different SRS resource sets are associated with different orthogonal SRS resources), thereby indicating that the first SRS resource set is associated with interference. As shown in FIG. 5, the UE 120 may detect interference associated with a cell-specific SRS resource set with an ID of 0. This cell-specific SRS resource set may be associated with a first set of UEs 120 (e.g., in a neighbor cell).

As shown by reference number 530, the UE 120 may measure SRS on a second group of SRS resource sets. For example, the UE 120 may measure SRS on a group of group-specific SRS resource sets, as shown. The UE 120 may identify the second group of SRS resource sets based at least in part on detecting the interference on the first SRS resource set in the first group of SRS resource sets. For example, the UE 120 may measure SRS on the second group of SRS resource sets based at least in part on determining that the second group is a child group of the first SRS resource set on which the interference was detected (e.g., the cell-specific SRS resource set with an ID of 0). The UE 120 may measure SRS on the second group in a similar manner as the first group, as described above.

In some aspects, if the UE 120 does not detect interference on other SRS resource sets in the first group, then the UE 120 may avoid measuring groups of SRS resource sets that are children of the other SRS resource sets in the first group, thereby conserving UE resources. Furthermore, in some aspects, transmission of SRS on those children SRS resource sets may be avoided, thereby conserving network resources and resources of other UEs that would otherwise transmit SRS.

As shown by reference number 535, the UE 120 may detect interference on a second SRS resource set included in the second group of SRS resource sets. The UE 120 may detect the interference based at least in part on measuring the SRS on the second group of SRS resource sets, in a similar manner as described above. As shown in FIG. 5, the UE 120 may detect interference associated with a group-specific SRS resource set with an ID of 1. This group-specific SRS resource set may be associated with a subset of the first set of UEs 120 that are associated with the cell-specific SRS resource set with an ID of 0.

As shown by reference number 540, the UE 120 may measure SRS on an $N^{th}$ group ($N \geq 2$) of SRS resource sets.

In example 500, N is equal to 3, and the UE 120 measures SRS on a third group of SRS resource sets. For example, the UE 120 may measure SRS on a group of UE-specific SRS resource sets, as shown. The UE 120 may identify the third group of SRS resource sets based at least in part on detecting the interference on the second SRS resource set in the second group of SRS resource sets. For example, the UE 120 may measure SRS on the third group of SRS resource sets based at least in part on determining that the third group is a child group of the second SRS resource set on which the interference was detected (e.g., the group-specific SRS resource set with an ID of 1). The UE 120 may measure SRS on the third group in a similar manner as described above.

As shown by reference number 545, the UE 120 may detect interference on an $N^{th}$ SRS resource set included in the $N^{th}$ group of SRS resource sets. As indicated above, in example 500, N is equal to 3, and the UE 120 detects interference on a third SRS resource set. The UE 120 may detect the interference based at least in part on measuring the SRS on the third group of SRS resource sets, in a similar manner as described above. As shown in FIG. 5, the UE 120 may detect interference associated with a UE-specific SRS resource set with an ID of 4. This UE-specific SRS resource set may be associated with a subset of the UEs 120 that are associated with the group-specific SRS resource set with an ID of 1.

The UE-specific SRS resource set may be associated with a single UE 120, which may be uniquely identified when interference is detected on the UE-specific SRS resource set with an ID of 4. In example 500, using the hierarchical SRS configuration, the UE 120 needs to measure seven SRS (e.g., one cell-specific SRS, three group-specific SRS, and three UE-specific SRS) to identify the UE 120 causing interference. Without using the hierarchical SRS configuration, the UE 120 would need to measure nine SRS (e.g., one for each UE in the cell, shown as having ID 4 through ID 12) to identify the UE 120 causing interference. Thus, the hierarchical SRS configuration may conserve resources of the UE 120 associated with measuring SRS, may conserve network resources associated with SRS transmissions, and/or the like. Additional resources may be conserved as the number of UEs 120 in a cell increases.

As described in more detail below in connection with FIGS. 7 and 8, the UE 120 may transmit, to a base station 110, an indication of the UE-specific SRS resource set associated with the interference. The base station 110 may use this indication to identify a neighbor UE 120 causing interference with the UE 120, and/or to perform one or more actions to mitigate the interference, as described in more detail below.

In some aspects, the UE 120 may be associated with multiple SRS resource sets (e.g., one in each group of SRS resource sets), and may be configured to transmit SRS on the multiple SRS resource sets (e.g., at different times) so that other UEs 120 can measure the SRS resource sets to detect interference from the UE 120. If the UE 120 cannot transmit and receive SRS at the same time, then the UE 120 may be configured with a pattern that indicates when the UE is to measure SRS (e.g., on one or more groups of SRS resource sets) and when the UE is to transmit SRS (e.g., on the multiple SRS resource sets with which the UE 120 is associated). In some aspects, the UE 120 may receive an indication of the pattern from a base station 110. Additionally, or alternatively, the UE 120 may be preconfigured with a default pattern.

In some aspects, the UE 120 may be configured to measure SRS more frequently when the UE 120 is in an active connected mode (e.g., is actively transmitting or receiving data), and may be configured to measure SRS less frequently when in a connected mode discontinuous reception (CDRX) cycle. In this way, the UE 120 may detect and/or mitigate interference when such detection or mitigation is most important (e.g., when the UE 120 is actively communicating), and may conserve battery power when the UE 120 is in a CDRX cycle and such interference is less likely to impact the UE 120.

As indicated above, FIG. 5 is provided as an example. Other examples are possible and may differ from what was described with respect to FIG. 5.

Figure 6:
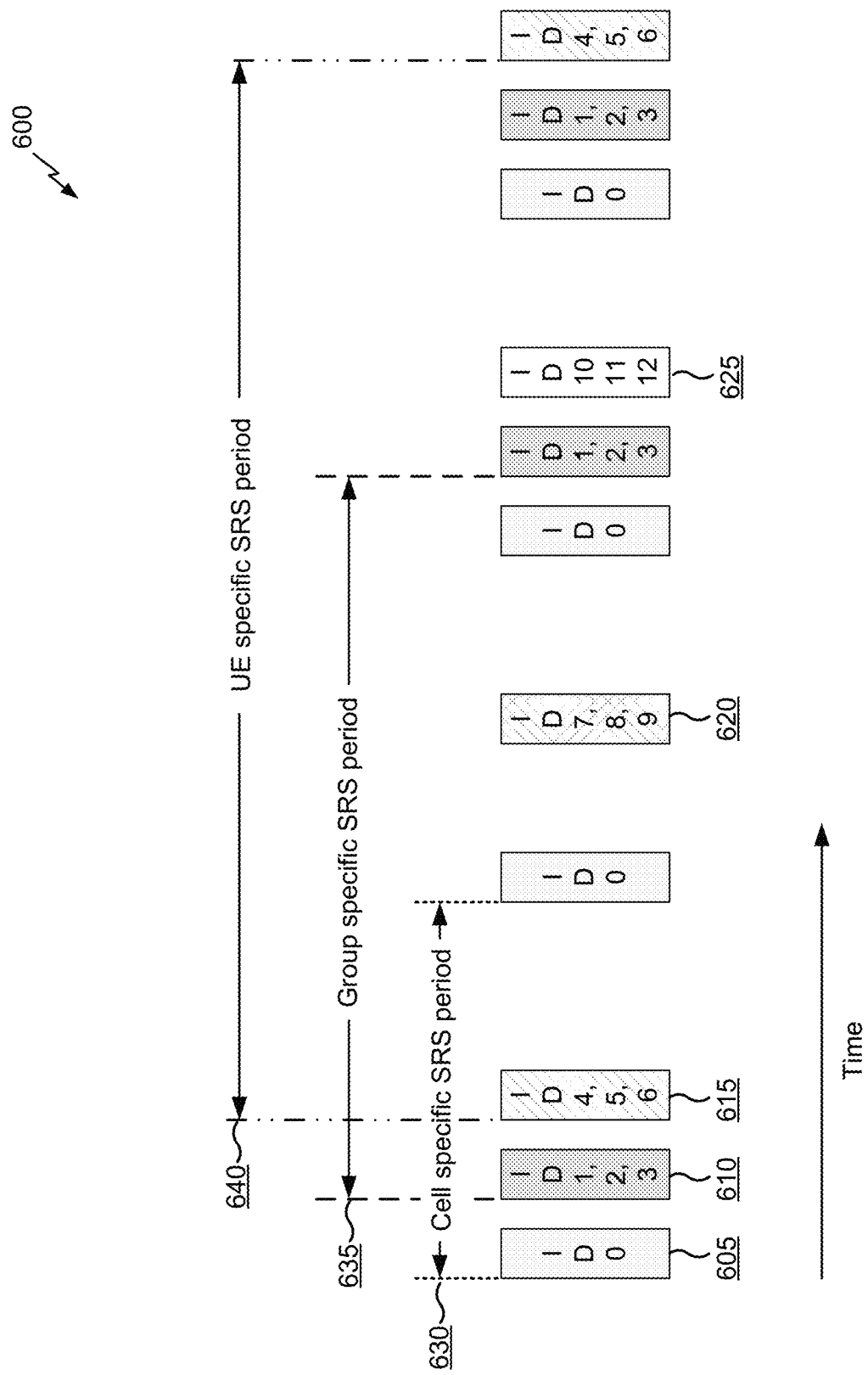

FIG. 6 is a diagram illustrating an example 600 relating to cross-link interference detection and mitigation, in accordance with various aspects of the present disclosure.

FIG. 6 shows example time periods for transmission or reception of SRS on different groups of SRS resource sets, according to the hierarchical SRS configuration described above in connection with FIG. 5. The time periods, number of groups, and number of SRS resource sets within a group, as shown in FIG. 6, are provided as examples. In practice, other examples are possible. FIG. 6 shows a cell-specific SRS resource set 605, a group-specific SRS resource set 610, a first UE-specific SRS resource set 615, a second UE-specific SRS resource set 620, and a third UE-specific SRS resource set 625. As shown, SRS resource sets that belong to the same group may be transmitted at the same time (e.g., using the same set of symbols, time resources, and/or the like), and SRS resource sets that belong to different groups may be transmitted at different times (e.g., using different sets of symbols, time resources, and/or the like). This may conserve UE resources used to monitor for and/or measure SRS.

As shown by reference number 630, the cell-specific SRS resource set 605 may be transmitted periodically with a shorter period than the group-specific SRS resource set 610 and the UE-specific SRS resource sets 615, 620, and 625. As shown by reference number 635, the group-specific SRS resource set 610 may be transmitted periodically with a longer period than the cell-specific SRS resource set 605 and a shorter period than the UE-specific SRS resource sets 615, 620, and 625. As shown by reference number 640, the first UE-specific SRS resource set 615 may be transmitted periodically with a longer period than the cell-specific SRS resource set 605 and the group-specific SRS resource set 610. Similarly, the second and third UE-specific SRS resource sets 620 and 625 may be transmitted periodically with a longer period than the cell-specific SRS resource set 605 and the group-specific SRS resource set 610.

In general, SRS of SRS resource sets that are associated with a larger number of UEs 120 may be transmitted more frequently (e.g., with a shorter period) than SRS of SRS resource sets that are associated with a smaller number of UEs 120. In this way, a base station 110 may quickly resolve scheduling conflicts at a coarser granularity (e.g., by avoiding scheduling a UE 120 with a large number of UEs 120), and may refine the interference mitigation over time to pinpoint a smaller number of UEs 120 and/or a single UE 120 causing interference, and may then resolve scheduling conflicts at a finer granularity (e.g., by avoiding scheduling the UE 120 with a small number of UEs 120 and/or a single UE 120).

As indicated above, FIG. 6 is provided as an example. Other examples are possible and may differ from what was described with respect to FIG. 6.

Figure 7:
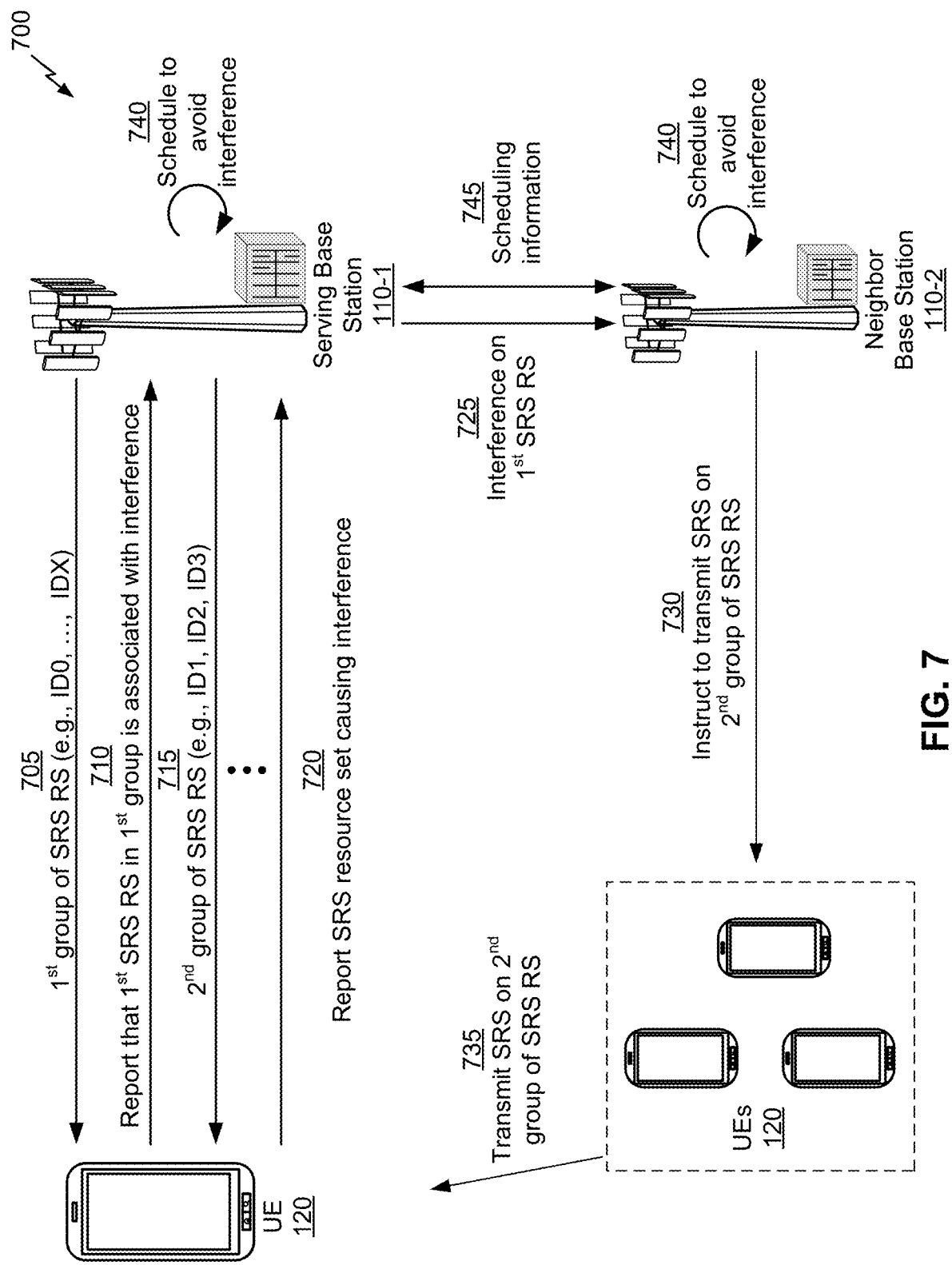

FIG. 7 is a diagram illustrating an example 700 relating to cross-link interference detection and mitigation, in accordance with various aspects of the present disclosure. FIG. 7 shows an example where a base station 110 indicates an SRS configuration to a UE 120 using an iterative process.

As shown by reference number 705, a serving base station 110-1 may transmit, to a UE 120, an indication of a first group of SRS resource sets (shown as SRS RS). For example, the first group of SRS resource sets may be a group of cell-specific resources sets (e.g., with ID 0 through ID X, as described above in connection with FIG. 5). The UE 120 may measure SRS on the first group of SRS resource sets, and may detect interference on a first SRS resource set included in the first group of SRS resource sets, as described above in connection with FIG. 5.

As shown by reference number 710, the UE 120 may transmit, and the serving base station 110-1 may receive, a report that indicates that the first SRS resource set is associated with interference. The report may indicate, for example, an identifier associated with the first SRS resource set (e.g., ID 0), a position in the hierarchy of the first SRS resource set (e.g., cell-specific, group-specific, UE-specific, and/or the like), the resources of the first SRS resource set (e.g., a time resource, a frequency resource, a sequence, a comb, and/or the like), and/or the like. The serving base station 110-1 may use the report to determine that the first SRS resource set is associated with interference, and may identify a second group of SRS resource sets that is a child of the first SRS resource set (e.g., using a hierarchical SRS configuration stored by the serving base station 110-1). For example, the serving base station 110-1 may identify a second group of SRS resource sets that includes group-specific SRS resource sets with ID 1, ID 2, and ID 3.

In some aspects, the UE 120 may report a single SRS resource set in a group (e.g., an SRS resource set associated with the most interference). In some aspects, the UE 120 may report multiple SRS resource sets in a group. For example, the UE 120 may report every SRS resource set associated with a measured parameter (e.g., an energy level, a power level, an RSRP parameter, an RSSI parameter, and/or the like) that satisfies a threshold. Additionally, or alternatively, the UE 120 may report a preconfigured number of SRS resource sets (e.g., associated with the most interference).

In some aspects, the UE 120 may transmit the report aperiodically based at least in part on detecting the interference. In some aspects, the UE 120 may configured with a periodic reporting schedule, and may transmit the report according to the periodic reporting schedule.

As shown by reference number 715, the serving base station 110-1 may transmit, to the UE 120, an indication of the second group of SRS resource sets. In some aspects, the second group of SRS resource sets may be indicated to the UE 120 after receiving the report that identifies the first SRS resource set (e.g., and based at least in part on the report). For example, the second group of SRS resource sets may be a group of group-specific resources sets (e.g., with ID 1, ID 2, and ID 3, as described above in connection with FIG. 5). The UE 120 may measure SRS on the second group of SRS resource sets, and may detect interference on a second SRS resource set included in the second group of SRS resource sets, as described above in connection with FIG. 5.

As shown by reference number 720, the UE 120 and the serving base station 110-1 may continue to communicate in this manner until the UE 120 reports a final SRS resource set associated with interference (e.g., an SRS resource set at the bottom of the hierarchical SRS configuration, with no child groups). Additionally, or alternatively, the UE 120 may indicate a second UE 120 causing the interference (e.g., when the final SRS resource set is a UE-specific SRS resource set). By using this iterative process to successively indicate a group of SRS resource sets to be measured, the serving base station 110-1 may conserve network resources that would otherwise be used to transmit an entire hierarchical SRS configuration. Furthermore, the serving base station 110-1 may dynamically adapt to different sets of UEs 120 entering or leaving a cell, and the UE 120 may avoid using a stale hierarchical SRS configuration. In some aspects, to achieve such dynamic adaptation, the serving base station 110-1 may indicate the group(s) of SRS resource sets using downlink control information (DCI). Additionally, or alternatively, the serving base station 110-1 may indicate the group(s) of SRS resource sets using remaining minimum system information (RMSI), other system information (OSI), a radio resource control (RRC) configuration message, and/or the like.

As shown by reference number 725, in some aspects, the serving base station 110-1 may transmit, to a neighbor base station 110-2, information that identifies an SRS resource set associated with the interference. For example, if the UE 120 reports that a first SRS resource set in a first group of SRS resource sets is associated with interference (e.g., as described above in connection with reference number 710), then the serving base station 110-1 may transmit, to the neighbor base station 110-2, information that indicates that the first SRS resource set is associated with interference.

As shown by reference number 730, the neighbor base station 110-2 may instruct UEs 120 associated with the first SRS resource set to transmit SRS in the second group of SRS resource sets (e.g., in different SRS resource sets corresponding to different sets of UEs 120). As shown by reference number 735, the UEs 120 may transmit SRS on the second group of SRS resource sets. These SRS may be measured by the UE 120, as described above in connection with reference number 715. In this way, the UEs 120 of the neighbor base station 110-2 may need to transmit SRS on the second group of SRS resource sets only when interference is detected in association with the first SRS resource set that is a parent of the second group of SRS resource sets, thereby conserving UE resources and network resources. In this case, transmission of SRS on the second group of SRS resource sets may be deactivated until an activation message is received from the neighbor base station 110-2. However, in some aspects, the UEs 120 of the neighbor base station 110-2 may always transmit SRS on the second group of SRS resource sets (e.g., may keep such transmissions activated), thereby reducing signaling overhead between the UEs 120 and the neighbor base station 110-2.

As shown by reference number 740, in some aspects, the serving base station 110-1 and/or the neighbor base station 110-2 may use information indicating that an SRS resource set is associated with interference to avoid scheduling conflicts between the UE 120 and other UEs 120 associated with the SRS resource set (e.g., to avoid scheduling the UE 120 and the other UEs 120 in a same TTI). In some aspects, the serving base station 110-1 and the neighbor base station 110-2 may exchange scheduling information to assist with avoiding such scheduling conflicts, as shown by reference number 745.

For example, the serving base station 110-1 may transmit scheduling information, associated with the UE 120, to the neighbor base station 110-2. The neighbor base station 110-2 may use this scheduling information to avoid scheduling conflicts between the UE 120 and other UEs 120 corresponding to the SRS resource set associated with interference. Additionally, or alternatively, the neighbor base station 110-2 may transmit scheduling information, associated with the other UEs 120 corresponding to the SRS resource set, to the serving base station 110-1. The neighbor base station 110-2 may use this scheduling information to avoid scheduling conflicts between the UE 120 and other UEs 120 corresponding to the SRS resource set associated with interference. In this way, UE to UE cross-link interference may be mitigated.

As indicated above, FIG. 7 is provided as an example. Other examples are possible and may differ from what was described with respect to FIG. 7.

Figure 8:
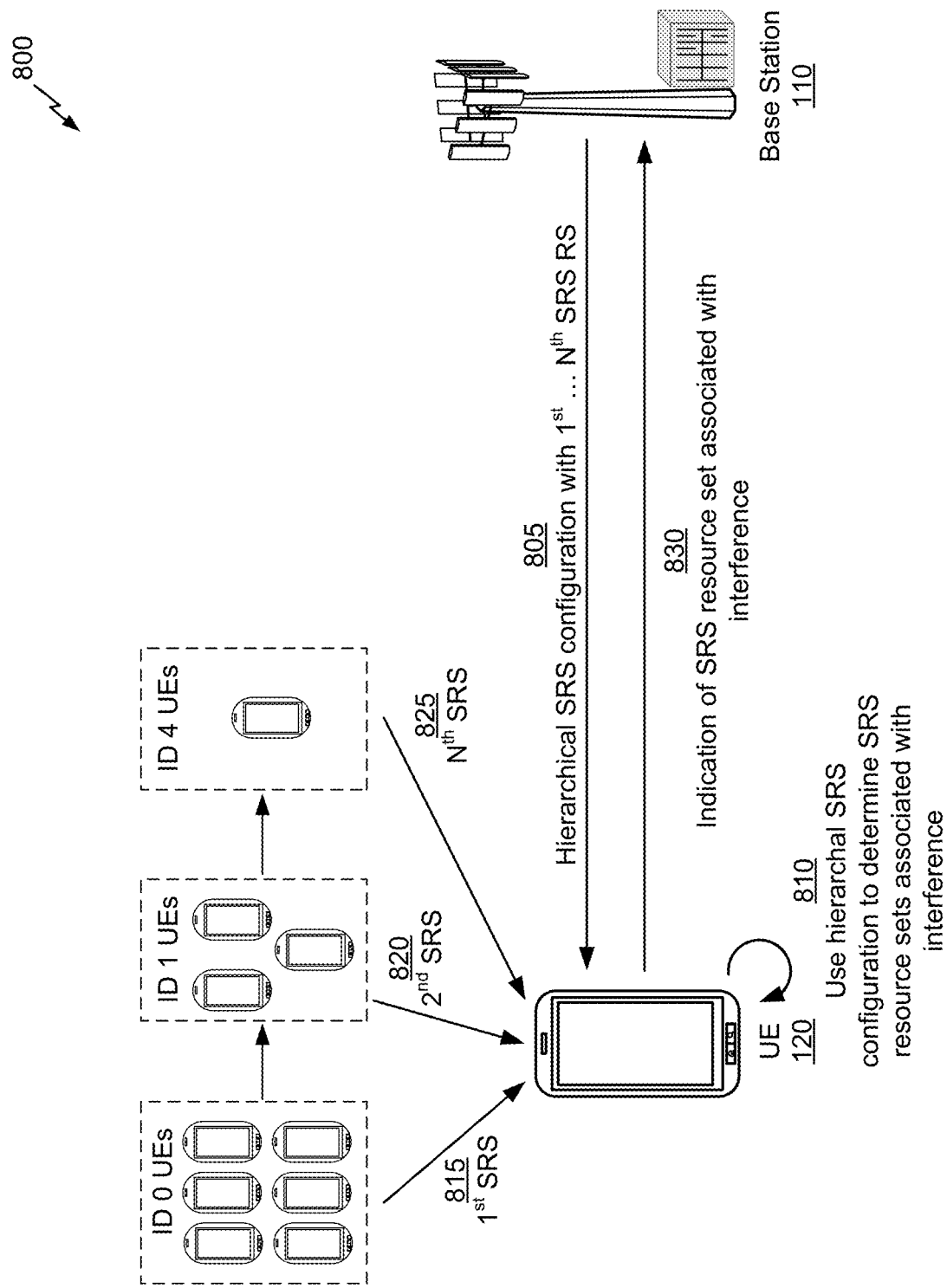

FIG. 8 is a diagram illustrating an example 800 relating to cross-link interference detection and mitigation, in accordance with various aspects of the present disclosure. FIG. 8 shows an example where a base station 110 indicates a hierarchical SRS configuration (e.g., a hierarchical association between SRS resource sets and/or groups of SRS resource sets, as described above in connection with FIG. 5) to a UE 120 (e.g., without using an iterative process).

As shown by reference number 805, a base station 110 may indicate, to a UE 120, a hierarchical SRS configuration. For example, the base station 110 may indicate multiple groups of SRS resource sets, the SRS resource sets included in each group of SRS resource sets, and/or a hierarchical relationship between SRS resource sets and/or groups of SRS resource sets. For example, the base station 110 may indicate a group of cell-specific SRS resource sets, multiple groups of group-specific SRS resource sets and a hierarchical relationship between each group-specific SRS resource set and a corresponding cell-specific SRS resource set, multiple groups of UE-specific SRS resource sets and a hierarchical relationship (e.g., a parent-child relationship) between each UE-specific SRS resource set and a corresponding group-specific SRS resource set, and/or the like.

As shown by reference number 810, the UE 120 may use the hierarchical SRS configuration to determine SRS resource sets associated with interference, in a similar manner as described elsewhere herein. For example, the UE 120 may measure first SRS 815 on a group of cell-specific SRS resource sets, and may detect interference on a cell-specific SRS resource set. Using the hierarchical SRS configuration, the UE 120 may identify a group of group-specific SRS resource sets corresponding to the cell-specific SRS resource set, may measure second SRS 820 on the group of group-specific SRS resource sets, and may detect interference on a group-specific SRS resource set. Using the hierarchical SRS configuration, the UE 120 may identify a group of UE-specific SRS resource sets corresponding to the group-specific SRS resource set, may measure third SRS 825 on the group of UE-specific SRS resource sets, and may detect interference on a UE-specific SRS resource set. As shown by reference number 830, the UE 120 may indicate, to the base station 110, the UE-specific SRS resource set associated with interference. The base station 110 may use this information to mitigate cross-link interference, as described elsewhere herein.

In some aspects, the base station 110 may indicate the hierarchical SRS configuration (and/or one or more parts of the hierarchical SRS configuration) to the UE 120 using, for example, RMSI, OSI, an RRC message, DCI, and/or the like. In some aspects, the base station 110 may use a combination of two or more of RMSI, OSI, an RRC message, DCI, and/or the like to indicate and/or activate measurement of SRS resource sets to the UE 120. For example, the base station 110 may indicate the hierarchical SRS configuration using RMSI and/or OSI, and may later activate measurement of one or more SRS resource sets for the UE 120 using an RRC message and/or DCI. As another example, the base station 110 may indicate the hierarchical SRS configuration using RMSI, OSI, and/or an RRC message, and may later activate measurement of one or more SRS resource sets for the UE 120 using DCI. In this way, resource overhead may be conserved, SRS measurements may be dynamically indicated, and/or the like.

Additionally, or alternatively, the base station 110 may indicate an SRS configuration without indicating a hierarchical relationship between SRS resource sets and/or groups of SRS resource sets. In this case, an identifier may be used to identify an SRS resource set and/or a group of SRS resource sets, and the base station 110 may activate SRS measurements, for the UE 120, on a group of SRS resource sets by transmitting a corresponding identifier to the UE 120. Additionally, or alternatively, the UE 120 may indicate an SRS resource set associated with interference using an identifier that corresponds to the SRS resource set. In this way, network resources may be conserved.

As indicated above, FIG. 8 is provided as an example. Other examples are possible and may differ from what was described with respect to FIG. 8.

Figure 9:
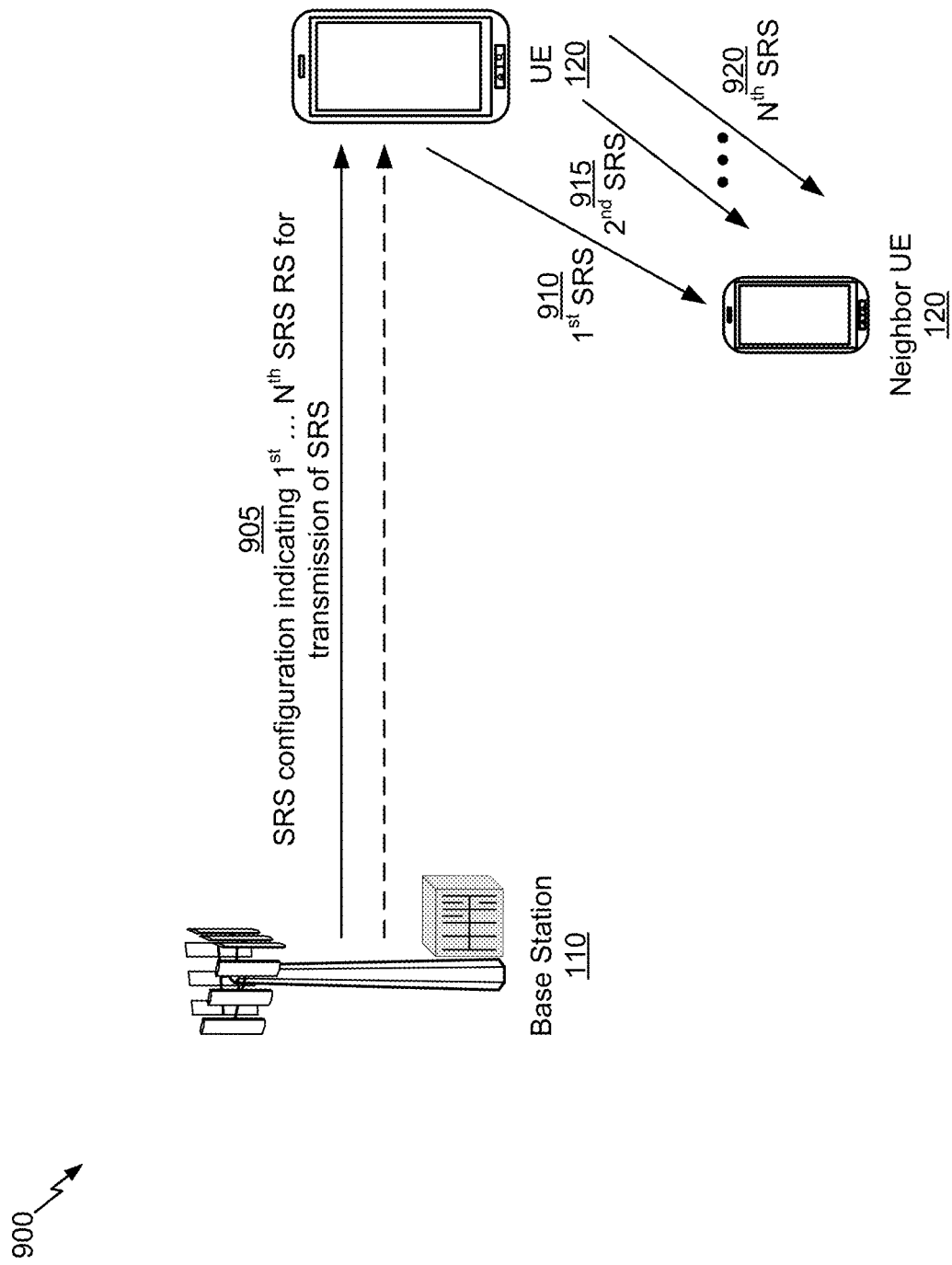

FIG. 9 is a diagram illustrating an example 900 relating to cross-link interference detection and mitigation, in accordance with various aspects of the present disclosure. FIG. 9 shows an example of instructing a UE 120 to transmit SRS on multiple SRS resource sets in different groups of SRS resource sets included in a hierarchical SRS configuration.

As shown by reference number 905, a base station 110 may transmit, and a UE 120 may receive, an SRS configuration indicating multiple SRS resource sets to be used by the UE 120 to transmit SRS. The multiple SRS resource sets may be included in different groups of SRS resource sets (e.g., as part of a hierarchical SRS configuration), as described above in connection with FIG. 5. For example, the SRS configuration may indicate a first SRS resource set (e.g., a cell-specific SRS resource set) to be used by the UE 120 to transmit SRS, a second SRS resource set (e.g., a group-specific SRS resource set) to be used by the UE 120 to transmit SRS, a third SRS resource set (e.g., a subgroup-specific SRS resource set) to be used by the UE 120 to transmit SRS, a fourth SRS resource set (e.g., a UE-specific SRS resource set) to be used by the UE 120 to transmit SRS, and/or the like. In some aspects, the base station 110 may indicate a hierarchical relationship between the SRS resource sets. In some aspects, the base station 110 may not indicate a hierarchical relationship between the SRS resource sets.

As further shown, the UE 120 may transmit a first SRS 910 on a first SRS resource set, may transmit a second SRS 915 on a second SRS resource set, may transmit an $N^{th}$ SRS 920 on an $N^{th}$ SRS resource set ($N \geq 2$), and/or the like. As further shown, a neighbor UE 120 may receive the SRS transmitted by the UE 120, may measure the SRS, and may use the SRS to detect interference, as described above. In some aspects, the UE 120 may transmit the first SRS 910, the second SRS 915, and/or the $N^{th}$ SRS 920 periodically with different periods, as described above in connection with FIG. 6. In some aspects, the UE 120 may be configured to transmit SRS more frequently when the UE 120 is in an active connected mode, and may be configured to transmit SRS less frequently when the UE 120 is in a CDRX cycle. In this way, the UE 120 may assist with interference detection when such detection is most likely to occur (e.g., when the UE 120 is actively communicating), and may conserve battery power when the UE 120 is in a CDRX cycle and such interference is less likely to occur.

In some aspects, SRS transmitted as part of an SRS resource set included in a hierarchical SRS configuration may be assigned a higher priority than other SRS (e.g., regular SRS, aperiodic SRS, and/or the like). In this case, if a hierarchical SRS collides with other SRS for transmission, then the hierarchical SRS may be transmitted, and the other SRS may be dropped. Additionally, or alternatively, if a hierarchical SRS collides with an uplink control communication (e.g., a short burst PUCCH, a long burst PUCCH, and/or the like) and/or an uplink data communication (e.g., on the PUSCH), then the hierarchical SRS may be transmitted, and the uplink control communication and/or the uplink data communication may be dropped.

In some aspects, the UE 120 may transmit one or more SRS on one or more corresponding SRS resource sets based at least in part on an indication that the one or more SRS resource sets are to be activated by the UE 120 for SRS transmissions. For example, the UE 120 may be receive an SRS configuration that indicates multiple SRS resource sets to be used by the UE 120 to transmit SRS, and may receive an indication of one or more of the SRS resource sets that are to be activated for the UE 120 and/or one or more of the SRS resource sets that are to be deactivated for the UE 120. The UE 120 may transmit SRS on the activated SRS resource sets, and may not transmit SRS on the deactivated SRS resource sets until the deactivated SRS resource sets are activated.

In some aspects, the activation or deactivation may occur dynamically, such as via an indication in DCI. In some aspects, the base station 110 may transmit an indication to activate an SRS resource set when interference is detected on a parent SRS resource set, as described above in connection with FIG. 7. For example, a first base station 110 may indicate a first SRS resource set and a second SRS resource set to be used for SRS transmissions by a first UE 120, and may activate the first SRS resource set and deactivate the second SRS resource set. The first UE 120 may transmit SRS on the first SRS resource set, and a second UE 120 may measure the SRS on the first SRS resource set. The second UE 120 may detect interference on the first SRS resource set, and may indicate such interference to a second base station 110. The second base station 110 may indicate, to the first base station 110, that the first SRS resource set is associated with interference. Based at least in part on this indication, the first base station 110 may instruct the first UE 120 to activate the second SRS resource set, and the first UE 120 may transmit SRS on the second SRS resource set. This process may continue until through a hierarchical SRS configuration until the second UE 120 and/or the second base station pinpoints a UE 120 and/or a set of UEs 120 causing interference with the second UE 120.

In some aspects, the base station 110 may indicate, to the UE 120, a hierarchical SRS configuration to be used for transmission of SRS. For example, the base station 110 may indicate multiple groups of SRS resource sets, the SRS resource sets included in each group of SRS resource sets, and/or a hierarchical relationship between SRS resource sets and/or groups of SRS resource sets. In some aspects, the base station 110 may indicate an SRS configuration without indicating a hierarchical relationship between SRS resource sets and/or groups of SRS resource sets. In either case, an identifier may be used to identify an SRS resource set within the SRS configuration, and the base station 110 may activate or deactivate SRS transmissions, for the UE 120, on an SRS resource set by transmitting a corresponding identifier to the UE 120.

In some aspects, the base station 110 may indicate the SRS configuration (and/or one or more parts of the SRS configuration) to the UE 120 using, for example, RMSI, OSI, an RRC message, DCI, and/or the like, in a similar manner as described above in connection with FIG. 8. Additionally, or alternatively, the base station 110 may indicate, to the UE 120, a pattern that indicates when the UE 120 is to measure SRS on one or more SRS resource sets and when the UE 120 is to transmit SRS on one or more SRS resource sets. In this way, the UE 120 may measure SRS from neighbor UEs 120 to detect interference, and may transmit SRS to the neighbor UEs 120 so that the neighbor UEs 120 can detect interference.

As indicated above, FIG. 9 is provided as an example. Other examples are possible and may differ from what was described with respect to FIG. 9.

Figure 10:
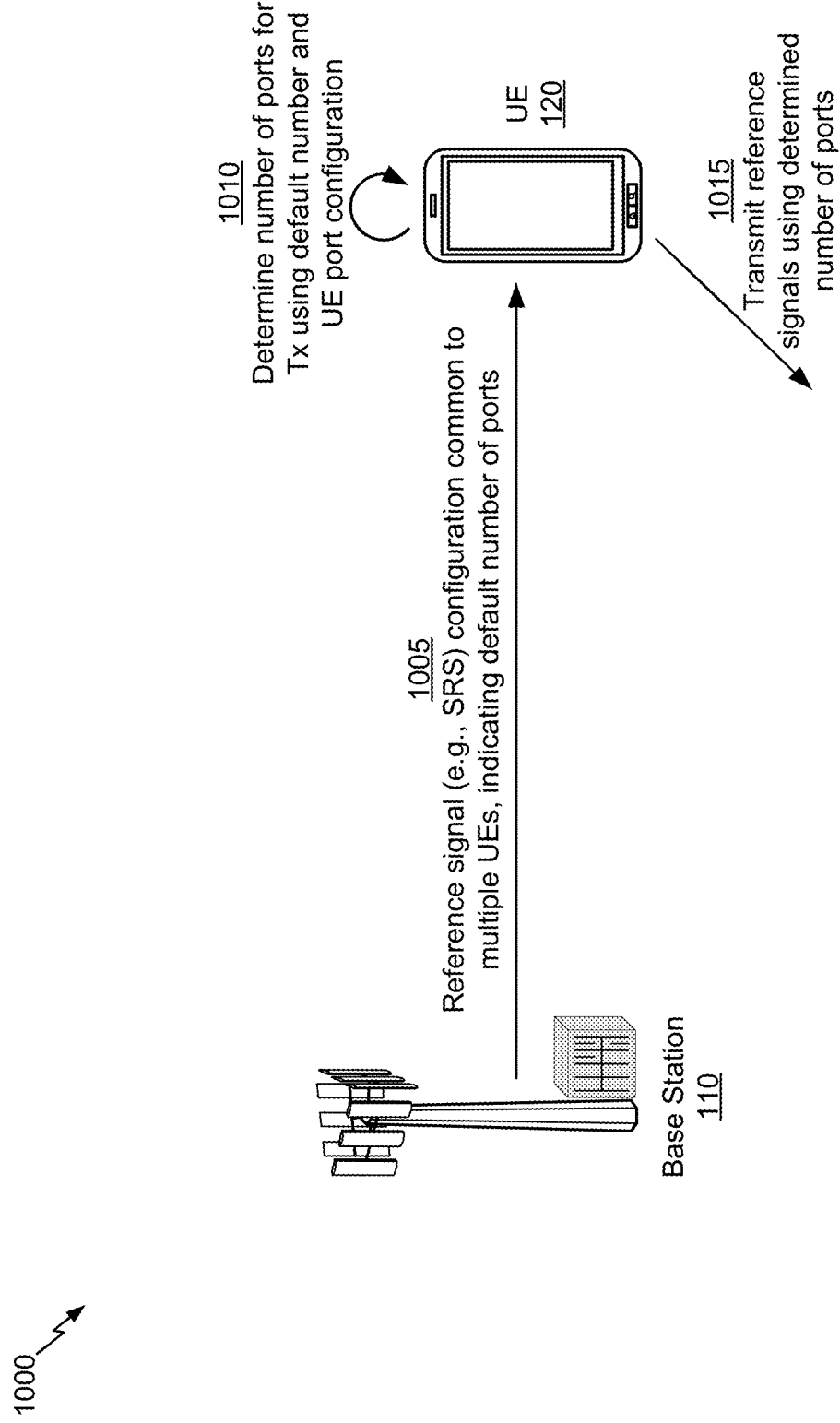

FIG. 10 is a diagram illustrating an example 1000 relating to cross-link interference detection and mitigation, in accordance with various aspects of the present disclosure.

As shown by reference number 1005, a base station 110 may transmit, and a UE 120 may receive, a reference signal configuration that is common for multiple UEs 120. For example, the base station 110 may broadcast a reference signal configuration (e.g., an SRS configuration, a clear to send (CTS) configuration, and/or the like) in RMSI, OSI, a group common downlink control channel (e.g., group common PDCCH), and/or the like. The reference signal configuration may indicate a default number of ports to use for transmission of a reference signal, such as an SRS, a CTS signal, and/or the like.

As shown by reference number 1010, the UE 120 may determine a number of ports to be used for transmission of the reference signal based at least in part on the default number of ports and a port configuration for the UE 120. The port configuration of the UE 120 may indicate, for example, a maximum number of ports of the UE 120, an available number of ports of the UE 120, and/or the like. In some aspects, different UEs 120 may be configured with and/or capable of communicating using different numbers of ports. In some cases, the number of ports of the UE 120 may not be the same as the default number of ports indicated in the reference signal configuration received from the base station 110 (e.g., because the reference signal configuration is a common configuration transmitted to multiple UEs 120, which may have different port configurations). In this case, the UE 120 may need to determine a number of ports to be used for transmission of the reference signal, where the number of ports is different from the default number of ports indicated in the reference signal configuration.

In some aspects, the default number of ports may indicate that the UE 120 is to use a maximum number of ports of the UE 120. In this case, the UE 120 may transmit the reference signal using a maximum number of ports of the UE 120.

In some aspects, the default number of ports may indicate that the UE 120 is to use more ports than a number of ports of the UE 120. In this case, the UE 120 may transmit the reference signal using a fixed subset (e.g., stored by the UE 120) of the default number of ports. For example, the fixed subset may be equal to the maximum number of ports of the UE 120. Alternatively, the fixed subset may be fewer than all of the ports of the UE 120. Additionally, or alternatively, the UE 120 may transmit the reference signal using different subsets of the default number of ports for different transmissions. For example, the UE 120 may transmit the reference signal using a first subset of the maximum number of ports of the UE 120 for a first transmission, may transmit the reference signal using a second subset of the maximum number of ports of the UE 120 for a second transmission, and/or the like. In this way, the UE 120 may cycle through ports of the UE 120 for different reference signal transmissions. In some aspects, each port of the UE 120 may be associated with a different cyclic shift. In this case, the UE 120 may select the ports for the transmission to maximize a minimum pairwise cyclic shift distance among selected ports, thereby improving performance.

In some aspects, the default number of ports may indicate that the UE 120 is to use fewer ports than a number of ports of the UE 120. In this case, the UE 120 may transmit the reference signal using different combinations of ports across different reference signal transmissions. In some aspects, the UE 120 may select the different combination of ports to include all ports of the UE 120 over a series of reference signal transmissions. For example, the UE 120 may cycle through all ports of the UE 120 for different reference signal transmissions. Additionally, or alternatively, the UE 120 may select the different combination of ports to include ports of the UE 120 used for a most recent uplink channel transmission (e.g., which may be associated with the best channel conditions).

In some aspects, the UE 120 may transmit the reference signal using a codebook indicated to the UE 120 by a base station 110. Additionally, or alternatively, the UE 120 may transmit the reference signal using a precoder determined by the UE based at least in part on a channel state information reference signal (CSI-RS). Additionally, or alternatively, the UE 120 may transmit the reference signal using one or more beams associated with beam parameters that satisfy a threshold.

As shown by reference number 1015, the UE 120 may transmit the reference signal using the determined number of ports. In some aspects, if the number of ports of the UE 120 is the same as the default number of ports, then the UE 120 may transmit the reference signal using the default number of ports. However, if the number of ports of the UE 120 is different from the default number of ports, then the UE 120 may transmit the reference signal using a number of ports determined as described above. In this way, signaling overhead may be reduced and network resources may be conserved by indicating a common reference signal configuration to multiple UEs 120, and the UEs 120 can adapt to the common reference signal configuration based at least in part on a local configuration and/or capability of the UEs 120.

As indicated above, FIG. 10 is provided as an example. Other examples are possible and may differ from what was described with respect to FIG. 10.

Figure 11:
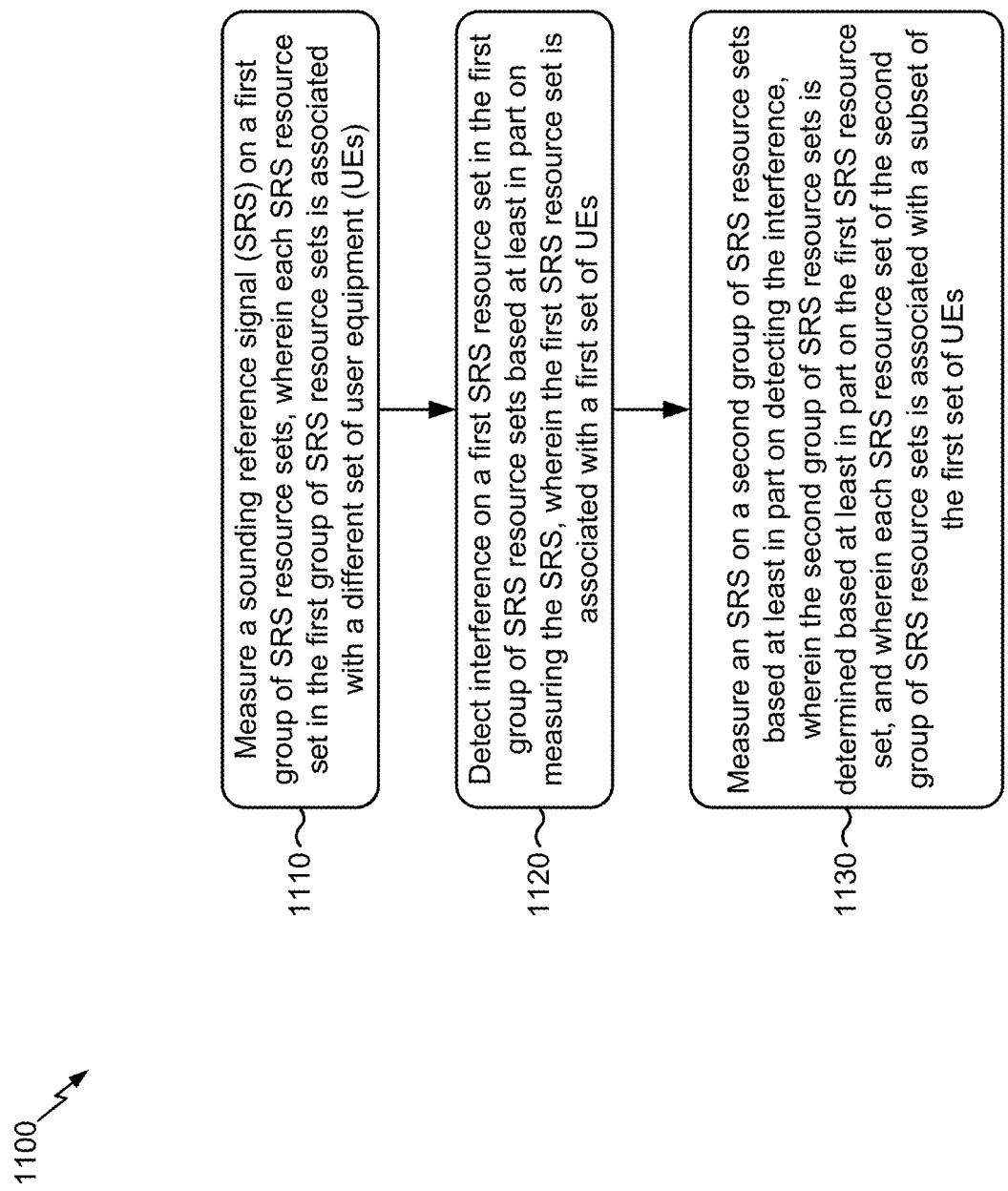
FIGS. 11-15 are diagrams illustrating example processes relating to cross-link interference detection and mitigation, in accordance with various aspects of the present disclosure.

FIG. 11 is a diagram illustrating an example process 1100 performed, for example, by a wireless node, in accordance with various aspects of the present disclosure. Example process 1100 is an example where a wireless node (e.g., base station 110, UE 120 and/or the like) performs operations relating to cross-link interference detection and mitigation. Although some operations are described herein as being performed by a UE, such operations may be performed by another type of wireless node, such as a base station. Furthermore, although some operations are described herein in connection with SRS, such operations may be performed in connection with another type of reference signal.

As shown in FIG. 11, in some aspects, process 1100 may include measuring a sounding reference signal (SRS) on a first group of SRS resource sets, wherein each SRS resource set in the first group of SRS resource sets is associated with a different set of user equipment (UEs) (block 1110). For example, the UE (e.g., using antenna 252, DEMOD 254, MIMO detector 256, receive processor 258, controller/processor 280, and/or the like) may measure SRS on a first group of SRS resource sets, as described above in connection with FIGS. 5-9. In some aspects, each SRS resource set in the first group of SRS resource sets is associated with a different set of UEs.

As further shown in FIG. 11, in some aspects, process 1100 may include detecting interference on a first SRS resource set in the first group of SRS resource sets based at least in part on measuring the SRS, wherein the first SRS resource set is associated with a first set of UEs (block 1120). For example, the UE (e.g., using controller/processor 280 and/or the like) may detect interference on a first SRS resource set in the first group of SRS resource sets based at least in part on measuring the SRS, as described above in connection with FIGS. 5-9. In some aspects, the first SRS resource set is associated with a first set of UEs.

As further shown in FIG. 11, in some aspects, process 1100 may include measuring an SRS on a second group of SRS resource sets based at least in part on detecting the interference, wherein the second group of SRS resource sets is determined based at least in part on the first SRS resource set, and wherein each SRS resource set of the second group of SRS resource sets is associated with a subset of the first set of UEs (block 1130). For example, the UE (e.g., using antenna 252, DEMOD 254, MIMO detector 256, receive processor 258, controller/processor 280, and/or the like) may measure an SRS on a second group of SRS resource sets based at least in part on detecting the interference, as described above in connection with FIGS. 5-9. In some aspects, the second group of SRS resource sets is determined based at least in part on the first SRS resource set. In some aspects, each SRS resource set of the second group of SRS resource sets is associated with a subset of the first set of UEs.

Process 1100 may include additional aspects, such as any single aspect or any combination of aspects described below and/or in connection with one or more other processes described herein.

In some aspects, each SRS resource set comprises a configured number of SRS ports, a set of symbols, and a fixed number of orthogonal SRS resources, within each symbol, corresponding to each of the configured number of SRS ports for that SRS resource set. In some aspects, detecting the interference on the first SRS resource set comprises measuring an SRS corresponding to one or more ports on one or more symbols of the first SRS resource set and determining that a measured parameter satisfies a threshold.

In some aspects, the UE may transmit an indication of a second SRS resource set associated with the interference based at least in part on measuring the SRS on the second group of SRS resource sets. In some aspects, the first SRS resource set and the SRS resource sets in the second group do not overlap in time. In some aspects, SRS resource sets belonging to a same group use different orthogonal SRS resources in a same set of symbol and same bandwidth part.

In some aspects, the second group of SRS resource sets is signaled to the UE based at least in part on a report, transmitted by the UE, that indicates the first SRS resource set that is associated with the interference. In some aspects, a hierarchical relationship between the first group of SRS resource sets and the second group of SRS resource sets, associated with each SRS resource set of the first group of SRS resource sets, is indicated in a hierarchical SRS configuration signaled to the UE. In some aspects, at least one of the first group of SRS resource sets or the second group of SRS resource sets is signaled to the UE in at least one of:

remaining minimum system information, other system information, a radio resource control configuration message, downlink control information, or some combination thereof.

In some aspects, the SRS on the first group of SRS resource sets is measured based at least in part on a pattern that indicates when the UE is to measure the SRS on the first group of SRS resource sets and that indicates when the UE is to transmit an SRS on an SRS resource set of the first group of SRS resource sets. In some aspects, the SRS on the first group of SRS resource sets is one of a cell-specific SRS, a UE group-specific SRS, or a UE subgroup-specific SRS; and the SRS on the second group of SRS resource sets is one of a UE group-specific SRS, a UE subgroup-specific SRS, or a UE-specific SRS. In some aspects, the UE is configured to measure the SRS on the first group or the second group more frequently when in an active connected mode and is configured to measure the SRS on the first group or the second group less frequently when in a connected mode discontinuous reception (CDRX) cycle.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
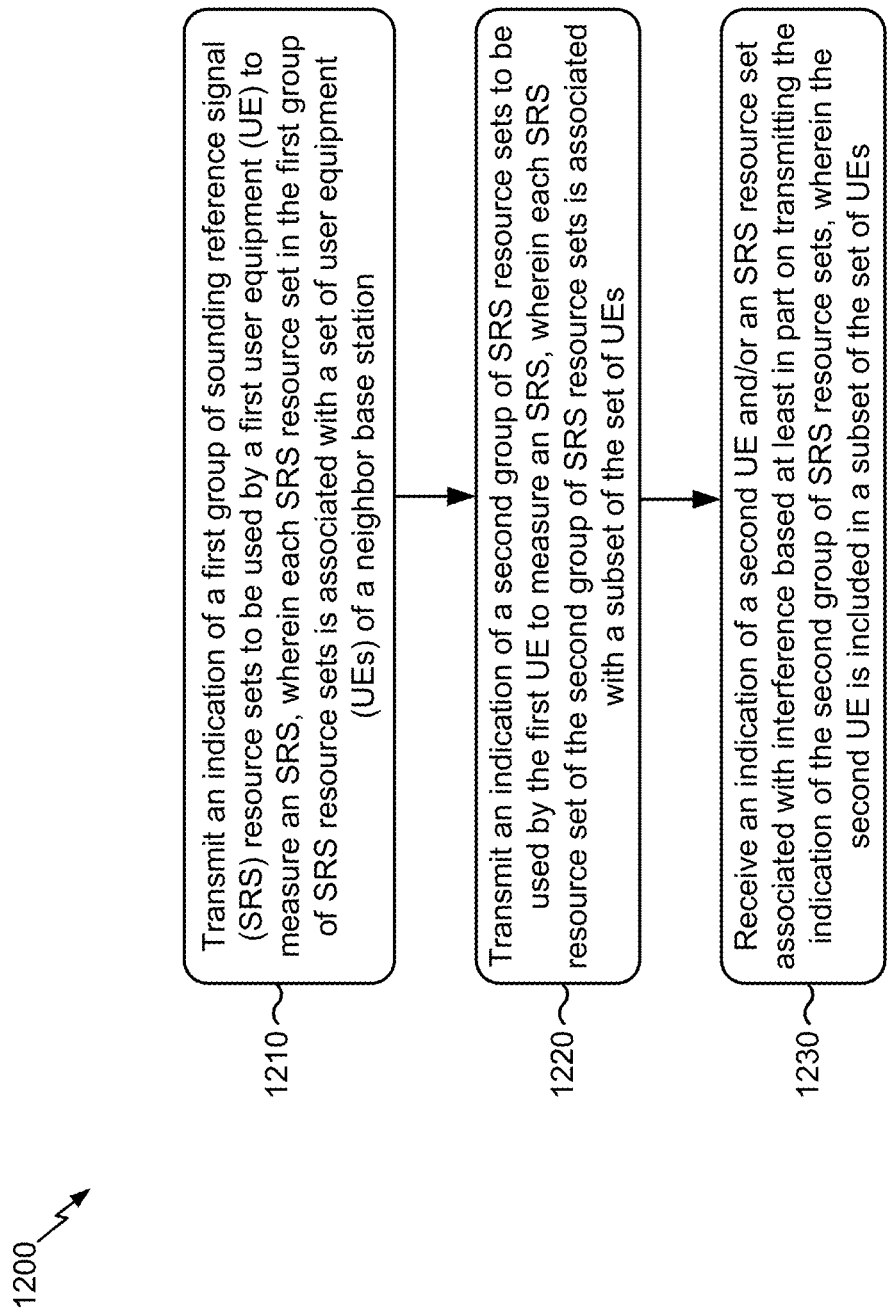

FIG. 12 is a diagram illustrating an example process 1200 performed, for example, by a base station, in accordance with various aspects of the present disclosure. Example process 1200 is an example where a base station (e.g., base station 110 and/or the like) performs operations relating to cross-link interference detection and mitigation. Although some operations are described herein in connection with SRS, such operations may be performed in connection with another type of reference signal.

As shown in FIG. 12, in some aspects, process 1200 may include transmitting an indication of a first group of sounding reference signal (SRS) resource sets to be used by a first user equipment (UE) to measure an SRS, wherein each SRS resource set in the first group of SRS resource sets is associated with a set of user equipment (UEs) of a neighbor base station (block 1210). For example, the base station (e.g., using controller/processor 240, transmit processor 220, TX MIMO processor 230, MOD 232, antenna 234, and/or the like) may transmit an indication of a first group of SRS resource sets to be used by a first UE to measure an SRS, as described above in connection with FIGS. 5-9. In some aspects, each SRS resource set in the first group of SRS resource sets is associated with a set of UEs of a neighbor base station.

As further shown in FIG. 12, in some aspects, process 1200 may include transmitting an indication of a second group of SRS resource sets to be used by the first UE to measure an SRS, wherein each SRS resource set of the second group of SRS resource sets is associated with a subset of the set of UEs (block 1220). For example, the base station (e.g., using controller/processor 240, transmit processor 220, TX MIMO processor 230, MOD 232, antenna 234, and/or the like) may transmit an indication of a second group of SRS resource sets to be used by the first UE to measure an SRS, as described above in connection with FIGS. 5-9. In some aspects, each SRS resource set of the second group of SRS resource sets is associated with a subset of the set of UEs.

As further shown in FIG. 12, in some aspects, process 1200 may include receiving an indication of a second UE or an SRS resource set associated with interference based at least in part on transmitting the indication of the second group of SRS resource sets, wherein the second UE is included in a subset of the set of UEs (block 1230). For example, the base station (e.g., using antenna 234, DEMOD 232, MIMO detector 236, receive processor 238, controller/processor 240, and/or the like) may receive an indication of a second UE or an SRS resource set associated with interference based at least in part on transmitting the indication of the second group of SRS resource sets, as described above in connection with FIGS. 5-9. In some aspects, the second UE is included in a subset of the set of UEs.

Process 1200 may include additional aspects, such as any single aspect or any combination of aspects described below and/or in connection with one or more other processes described herein.

In some aspects, each SRS resource set comprises a configured number of SRS ports, a set of symbols, and a fixed number of orthogonal SRS resources within each symbol corresponding to each of the configured number of SRS ports for that SRS resource set. In some aspects, the SRS resource sets in the first group and the SRS resource sets in the second group do not overlap in time. In some aspects, SRS resource sets belonging to a same group use different orthogonal SRS resources in a same set of symbol and same bandwidth part.

In some aspects, the indication of the second group of SRS resource sets is transmitted to the first UE based at least in part on a report, received from the first UE, that indicates that an SRS resource set in the first group of SRS resource sets is associated with the interference. In some aspects, the base station may transmit information that identifies the SRS resource set, associated with the interference, to the neighbor base station based at least in part on the report. In some aspects, a hierarchical relationship between the first group of SRS resource sets and the second group of SRS resource sets, associated with each SRS resource set of the first group of SRS resource sets, is indicated in a hierarchical SRS configuration signaled to the first UE. In some aspects, at least one of the first group of SRS resource sets or the second group of SRS resource sets is signaled to the first UE in at least one of: remaining minimum system information, other system information, a radio resource control configuration message, downlink control information, or some combination thereof.

In some aspects, the base station may signal, to the first UE, a pattern that indicates when the first UE is to measure the SRS on the first group of SRS resource sets and that indicates when the first UE is to transmit an SRS on an SRS resource set of the first group of SRS resource sets. In some aspects, the SRS on the first group of SRS resource sets is one of a cell-specific SRS, a UE group-specific SRS, or a UE subgroup-specific SRS; and the SRS on the second group of SRS resource sets is one of a UE group-specific SRS, a UE subgroup-specific SRS, or a UE-specific SRS.

In some aspects, the base station may transmit, to the neighbor base station, information that identifies the second UE or the SRS resource set associated with the interference. In some aspects, the base station may schedule one or more communications for the first UE based at least in part on scheduling information associated with the second UE or the subset of the set of UEs that includes the second UE. In some aspects, the base station may transmit first scheduling information, associated with the first UE, to the neighbor base station, or may receive, from the neighbor base station, second scheduling information associated with the second UE or the subset of the set of UEs that includes the second UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
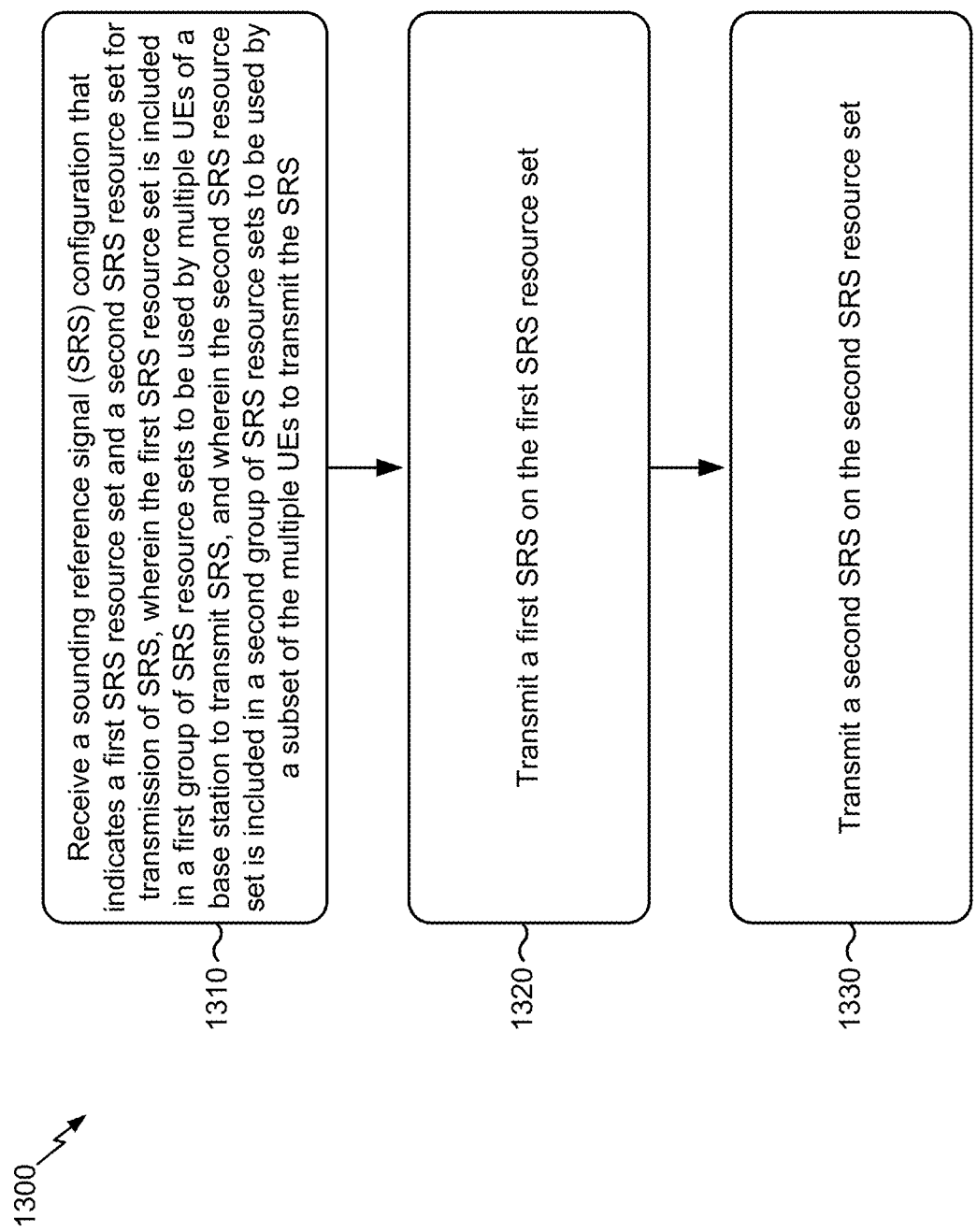

FIG. 13 is a diagram illustrating an example process 1300 performed, for example, by a wireless node, in accordance with various aspects of the present disclosure. Example process 1300 is an example where a wireless node (e.g., base station 110, UE 120 and/or the like) performs operations relating to cross-link interference detection and mitigation. Although some operations are described herein as being performed by a UE, such operations may be performed by another type of wireless node, such as a base station. Furthermore, although some operations are described herein in connection with SRS, such operations may be performed in connection with another type of reference signal.

As shown in FIG. 13, in some aspects, process 1300 may include receiving a sounding reference signal (SRS) configuration that indicates a first SRS resource set and a second SRS resource set for transmission of SRS, wherein the first SRS resource set is included in a first group of SRS resource sets to be used by multiple UEs of a base station to transmit SRS, and wherein the second SRS resource set is included in a second group of SRS resource sets to be used by a subset of the multiple UEs to transmit the SRS (block 1310). For example, the UE (e.g., using antenna 252, DEMOD 254, MIMO detector 256, receive processor 258, controller/processor 280, and/or the like) may receive an SRS configuration that indicates a first SRS resource set and a second SRS resource set for transmission of SRS, as described above in connection with FIGS. 5-9. In some aspects, the first SRS resource set is included in a first group of SRS resource sets to be used by multiple UEs of a base station to transmit SRS. In some aspects, the second SRS resource set is included in a second group of SRS resource sets to be used by a subset of the multiple UEs to transmit the SRS.

As further shown in FIG. 13, in some aspects, process 1300 may include transmitting a first SRS on the first SRS resource set (block 1320). For example, the UE (e.g., using controller/processor 280, transmit processor 264, TX MIMO processor 266, MOD 254, antenna 252, and/or the like) may transmit a first SRS on the first SRS resource set, as described above in connection with FIGS. 5-9.

As further shown in FIG. 13, in some aspects, process 1300 may include transmitting a second SRS on the second SRS resource set (block 1330). For example, the UE (e.g., using controller/processor 280, transmit processor 264, TX MIMO processor 266, MOD 254, antenna 252, and/or the like) may transmit a second SRS on the second SRS resource set, as described above in connection with FIGS. 5-9.

Process 1300 may include additional aspects, such as any single aspect or any combination of aspects described below and/or in connection with one or more other processes described herein.

In some aspects, different orthogonal SRS resources are associated with each SRS resource set of the first group of SRS resource sets. In some aspects, the first SRS resource set and the second SRS resource set do not overlap in time. In some aspects, the UE is configured to transmit the first SRS on the first SRS resource set and the second SRS on the second SRS resource set based at least in part on an indication that the first SRS resource set and the second SRS resource set are to be activated by the UE for SRS transmissions.

In some aspects, the second SRS is transmitted based at least in part on an indication to activate the second SRS resource set. In some aspects, the indication to activate the second SRS resource set is received after transmitting the first SRS. In some aspects, a hierarchical relationship between the first SRS resource set and the second SRS resource set are indicated in the SRS configuration signaled to the UE. In some aspects, the first SRS resource set and the second SRS resource set are identified by the UE using an identifier that identifies the first SRS resource set and the second SRS resource set within the SRS configuration. In some aspects, at least one of the first SRS resource set or the second SRS resource set is signaled to the UE in at least one of: remaining minimum system information, other system information, a radio resource control configuration message, downlink control information, or some combination thereof.

In some aspects, the first SRS is transmitted based at least in part on a pattern that indicates when the UE is to measure SRS on the first SRS resource set and that indicates when the UE is to transmit SRS on the first SRS resource set. In some aspects, the first SRS is one of a cell-specific SRS, a UE group-specific SRS, or a UE subgroup-specific SRS; and the second SRS is one of a UE group-specific SRS, a UE subgroup-specific SRS, or a UE-specific SRS.

In some aspects, the first SRS and the second SRS are transmitted periodically, and the first SRS is transmitted more frequently than the second SRS. In some aspects, the UE is configured to transmit the first SRS more frequently when in an active connected mode and is configured to transmit the first SRS less frequently when in a connected mode discontinuous reception (CDRX) cycle.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
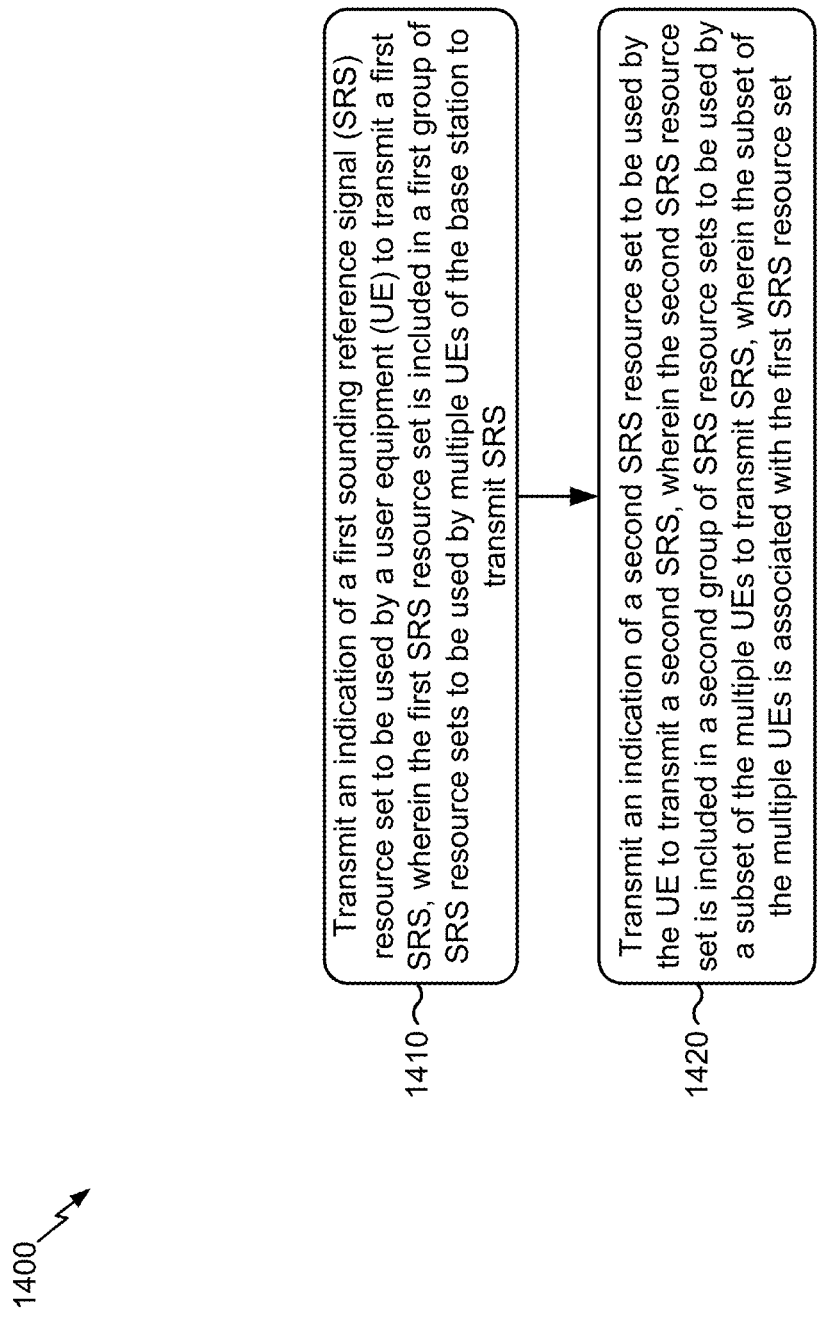

FIG. 14 is a diagram illustrating an example process 1400 performed, for example, by a base station, in accordance with various aspects of the present disclosure. Example process 1400 is an example where a base station (e.g., base station 110 and/or the like) performs operations relating to cross-link interference detection and mitigation. Although some operations are described herein in connection with SRS, such operations may be performed in connection with another type of reference signal.

As shown in FIG. 14, in some aspects, process 1400 may include transmitting an indication of a first sounding reference signal (SRS) resource set to be used by a user equipment (UE) to transmit a first SRS, wherein the first SRS resource set is included in a first group of SRS resource sets to be used by multiple UEs of the base station to transmit SRS (block 1410). For example, the base station (e.g., using controller/processor 240, transmit processor 220, TX MIMO processor 230, MOD 232, antenna 234, and/or the like) may transmit an indication of a first SRS resource set to be used by a UE to transmit a first SRS, as described above in connection with FIGS. 5-9. In some aspects, the first SRS resource set is included in a first group of SRS resource sets to be used by multiple UEs of the base station to transmit SRS.

As further shown in FIG. 14, in some aspects, process 1400 may include transmitting an indication of a second SRS resource set to be used by the UE to transmit a second SRS, wherein the second SRS resource set is included in a second group of SRS resource sets to be used by a subset of the multiple UEs to transmit SRS, wherein the subset of the multiple UEs is associated with the first SRS resource set (block 1420). For example, the base station (e.g., using controller/processor 240, transmit processor 220, TX MIMO processor 230, MOD 232, antenna 234, and/or the like) may transmit an indication of a second SRS resource set to be used by the UE to transmit a second SRS, as described above in connection with FIGS. 5-9. In some aspects, the second SRS resource set is included in a second group of SRS resource sets to be used by a subset of the multiple UEs to transmit SRS. In some aspects, the subset of the multiple UEs is associated with the first SRS resource set.

Process 1400 may include additional aspects, such as any single aspect or any combination of aspects described below and/or in connection with one or more other processes described herein.

In some aspects, different orthogonal SRS resources are associated with each SRS resource set of the first group of SRS resource sets. In some aspects, the first SRS resource set and the second SRS resource set do not overlap in time. In some aspects, different SRS resource sets within a group of SRS resource sets correspond to different subsets of multiple UEs associated with the group of SRS resources and use different orthogonal SRS resources in a same symbol and a same bandwidth part.

In some aspects, the first SRS resource set and the second SRS resource set are indicated using an identifier that identifies the first SRS resource set and the second SRS resource set within an SRS configuration for the UE. In some aspects, at least one of the first SRS resource set or the second SRS resource set is indicated based at least in part on receiving a report that indicates that at least one of the multiple UEs, the subset of the multiple UEs, or the UE is causing interference. In some aspects, a hierarchical relationship between the first SRS resource set and the second SRS resource set is indicated in a hierarchical SRS configuration signaled to the UE. In some aspects, at least one of the first SRS resource set or the second SRS resource set is signaled to the UE in at least one of: remaining minimum system information, other system information, a radio resource control configuration message, downlink control information, or some combination thereof.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
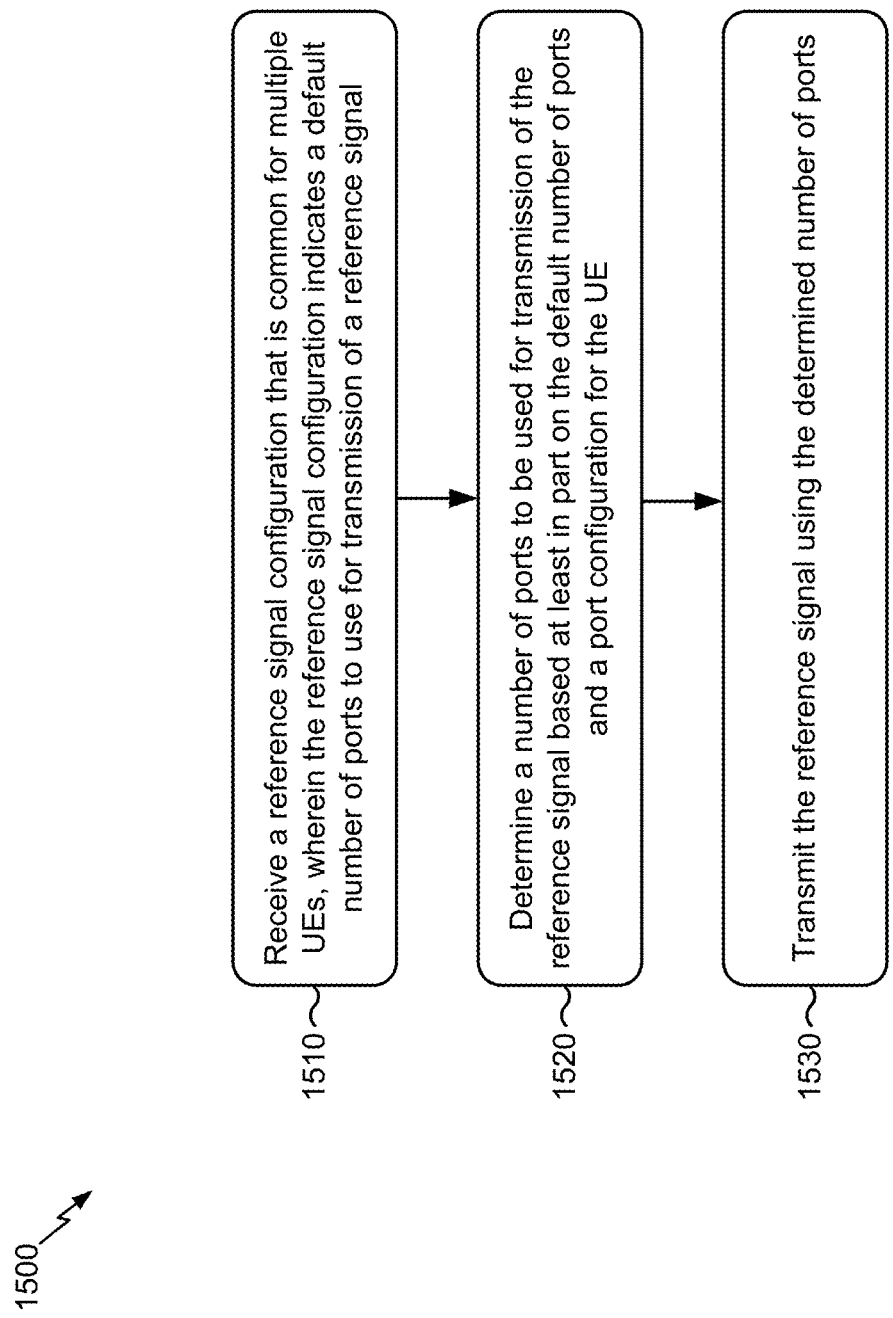

FIG. 15 is a diagram illustrating an example process 1500 performed, for example, by a wireless node, in accordance with various aspects of the present disclosure. Example process 1500 is an example where a wireless node (e.g., base station 110, UE 120 and/or the like) performs operations relating to cross-link interference detection and mitigation. Although some operations are described herein as being performed by a UE, such operations may be performed by another type of wireless node, such as a base station. Furthermore, although some operations are described herein in connection with SRS, such operations may be performed in connection with another type of reference signal.

As shown in FIG. 15, in some aspects, process 1500 may include receiving a reference signal configuration that is common for multiple UEs, wherein the reference signal configuration indicates a default number of ports to use for transmission of a reference signal (block 1510). For example, the UE (e.g., using antenna 252, DEMOD 254, MIMO detector 256, receive processor 258, controller/processor 280, and/or the like) may receive a reference signal configuration that is common for multiple UEs, wherein the reference signal configuration indicates a default number of ports to use for transmission of a reference signal, as described above in connection with FIG. 10.

As further shown in FIG. 15, in some aspects, process 1500 may include determining a number of ports to be used for transmission of the reference signal based at least in part on the default number of ports and a port configuration for the UE (block 1520). For example, the UE (e.g., using controller/processor 280 and/or the like) may determine a number of ports to be used for transmission of the reference signal based at least in part on the default number of ports and a port configuration for the UE, as described above in connection with FIG. 10.

As further shown in FIG. 15, in some aspects, process 1500 may include transmitting the reference signal using the determined number of ports (block 1530). For example, the UE (e.g., using controller/processor 280, transmit processor 264, TX MIMO processor 266, MOD 254, antenna 252, and/or the like) may transmit the reference signal using the determined number of ports, as described above in connection with FIG. 10.

Process 1500 may include additional aspects, such as any single aspect or any combination of aspects described below and/or in connection with one or more other processes described herein.

In some aspects, the reference signal is transmitted using a maximum number of ports of the UE when the default number of ports indicates that the UE is to use a maximum number of ports of the UE. In some aspects, the reference signal is transmitted using at least one of the following when the default number of ports indicates that the UE is to use more ports than a maximum number of ports of the UE: a fixed subset of the default number of ports, different subsets of the default number ports for different transmissions, or a subset of ports selected to maximize a minimum pairwise cyclic shift distance, wherein each port of the UE is associated with a different cyclic shift. In some aspects, a size of the fixed subset is equal to the maximum number of ports of the UE.

In some aspects, the reference signal is transmitted using different combinations of ports across different reference signal transmissions when the default number of ports indicates that the UE is to use fewer ports than a maximum number of ports of the UE. In some aspects, the different combinations of ports are selected to include all ports of the UE over a series of reference signal transmissions. In some aspects, the different combinations of ports are selected to include ports of the UE used for a most recent uplink channel transmission.

In some aspects, the reference signal is transmitted using at least one of a codebook indicated to the UE or a precoder determined by the UE based at least in part on a channel state information reference signal (CSI-RS). In some aspects, the reference signal is transmitted using one or more beams associated with beam parameters that satisfy a threshold. In some aspects, the reference signal is a sounding reference signal (SRS) or a clear to send (CTS) reference signal.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node, comprising:
    measuring a reference signal (RS) on a first group of RS resource sets, wherein each RS resource set in the first group of RS resource sets is associated with a different set of wireless nodes;
    detecting interference on a first RS resource set in the first group of RS resource sets based at least in part on measuring the RS, wherein the first RS resource set is associated with a first set of wireless nodes; and
    measuring an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes, and a hierarchical relationship between the first group of RS resource sets and the second group of RS resource sets, associated with each RS resource set of the first group of RS resource sets, is indicated in a hierarchical RS configuration signaled to the wireless node.

2. The method of claim 1, wherein each RS resource set comprises a configured number of RS ports, a set of symbols, and a fixed number of orthogonal RS resources, within each symbol, corresponding to each of the configured number of RS ports for that RS resource set.

3. The method of claim 1, wherein detecting the interference on the first RS resource set comprises measuring an RS corresponding to one or more ports on one or more symbols of the first RS resource set and determining that a measured parameter satisfies a threshold.

4. The method of claim 1, further comprising transmitting an indication of a second RS resource set associated with the interference based at least in part on measuring the RS on the second group of RS resource sets.

5. The method of claim 1, wherein the first RS resource set and the RS resource sets in the second group do not overlap in time.

6. The method of claim 1, wherein RS resource sets belonging to a same group use different orthogonal RS resources in a same set of symbol and same bandwidth part.

7. The method of claim 1, wherein the second group of RS resource sets is signaled to the wireless node based at least in part on a report, transmitted by the wireless node, that indicates the first RS resource set that is associated with the interference.

8. The method of claim 1, wherein at least one of the first group of RS resource sets or the second group of RS resource sets is signaled to the wireless node in at least one of:
    remaining minimum system information,
    other system information,
    a radio resource control configuration message,
    downlink control information, or
    some combination thereof.

9. The method of claim 1, wherein the RS on the first group of RS resource sets is measured based at least in part on a pattern that indicates when the wireless node is to measure the RS on the first group of RS resource sets and that indicates when the wireless node is to transmit an RS on an RS resource set of the first group of RS resource sets.

10. The method of claim 1, wherein the RS on the first group of RS resource sets is one of a cell-specific RS, a wireless node group-specific RS, or a wireless node sub-group-specific RS; and
    wherein the RS on the second group of RS resource sets is one of a wireless node group-specific RS, a wireless node subgroup-specific RS, or a wireless node-specific RS.

11. The method of claim 1, wherein the wireless node is configured to measure the RS on the first group or the second group more frequently when in an active connected mode and is configured to measure the RS on the first group or the second group less frequently when in a connected mode discontinuous reception (CDRX) cycle.

12. The method of claim 1, wherein the RS is a sounding reference signal (SRS), the first group of RS resource sets is a first group of SRS resource sets, the first RS resource set is a first SRS resource set, and the second group of RS resource sets is a second group of SRS resource sets.

13. A method of wireless communication performed by a wireless node, comprising:
receiving a reference signal (RS) configuration that indicates a first RS resource set and a second RS resource set for transmission of RS, wherein the first RS resource set is included in a first group of RS resource sets to be used by multiple wireless nodes of a base station to transmit RSs, and wherein the second RS resource set is included in a second group of RS resource sets to be used by a subset of the multiple wireless nodes to transmit RSs;
transmitting a first RS on the first RS resource set; and
transmitting a second RS on the second RS resource set,
wherein a hierarchical relationship between the first RS resource set and the second RS resource set are indicated in the RS configuration signaled to the wireless node.

14. The method of claim 13, wherein different orthogonal RS resources are associated with each RS resource set of the first group of RS resource sets.

15. The method of claim 13, wherein the first RS resource set and the second RS resource set do not overlap in time.

16. The method of claim 13, wherein the wireless node is configured to transmit the first RS on the first RS resource set and the second RS on the second RS resource set based at least in part on an indication that the first RS resource set and the second RS resource set are to be activated by the wireless node for RS transmissions.

17. The method of claim 13, wherein the second RS is transmitted based at least in part on an indication to activate the second RS resource set.

18. The method of claim 17, wherein the indication to activate the second RS resource set is received after transmitting the first RS.

19. The method of claim 13, wherein the first RS resource set and the second RS resource set are identified by the wireless node using an identifier that identifies the first RS resource set and the second RS resource set within the RS configuration.

20. The method of claim 13, wherein at least one of the first RS resource set or the second RS resource set is signaled to the wireless node in at least one of:
remaining minimum system information,
other system information,
a radio resource control configuration message,
downlink control information, or
some combination thereof.

21. The method of claim 13, wherein the first RS is transmitted based at least in part on a pattern that indicates when the wireless node is to measure RS on the first RS resource set and that indicates when the wireless node is to transmit RS on the first RS resource set.

22. The method of claim 13, wherein the first RS is one of a cell-specific RS, a wireless node group-specific RS, or a wireless node subgroup-specific RS; and
wherein the second RS is one of a wireless node group-specific RS, a wireless node subgroup-specific RS, or a wireless node-specific RS.

23. The method of claim 13, wherein the first RS and the second RS are transmitted periodically, and wherein the first RS is transmitted more frequently than the second RS.

24. The method of claim 13, wherein the wireless node is configured to transmit the first RS more frequently when in an active connected mode and is configured to transmit the first RS less frequently when in a connected mode discontinuous reception (CDRX) cycle.

25. The method of claim 13, wherein the RS configuration is a sounding reference signal (SRS) configuration, the first RS resource set is a first SRS resource set, the second RS resource set is a second SRS resource set, the RS is an SRS, the first group of RS resource sets is a first group of SRS resource sets, the second group of RS resource sets is a second group of SRS resource sets, the first RS is a first SRS, and the second RS is a second SRS.

26. A wireless node for wireless communication, comprising:
a memory; and
one or more processors operatively coupled to the memory, the memory and the one or more processors configured to:
measure a reference signal (RS) on a first group of RS resource sets, wherein each RS resource set in the first group of RS resource sets is associated with a different set of wireless nodes;
detect interference on a first RS resource set in the first group of RS resource sets based at least in part on measuring the RS, wherein the first RS resource set is associated with a first set of wireless nodes; and
measure an RS on a second group of RS resource sets based at least in part on detecting the interference, wherein the second group of RS resource sets is determined based at least in part on the first RS resource set, and wherein each RS resource set of the second group of RS resource sets is associated with a subset of the first set of wireless nodes, and a hierarchical relationship between the first group of RS resource sets and the second group of RS resource sets, associated with each RS resource set of the first group of RS resource sets, is indicated in a hierarchical RS configuration signaled to the wireless node.

27. The wireless node of claim 26, wherein the RS is a sounding reference signal (SRS), the first group of RS resource sets is a first group of SRS resource sets, the first RS resource set is a first SRS resource set, and the second group of RS resource sets is a second group of SRS resource sets.

28. A wireless node for wireless communication, comprising:
a memory; and
one or more processors operatively coupled to the memory, the memory and the one or more processors configured to:
receive a reference signal (RS) configuration that indicates a first RS resource set and a second RS resource set for transmission of RS, wherein the first RS resource set is included in a first group of RS resource sets to be used by multiple wireless nodes of a base station to transmit RSs, and wherein the second RS resource set is included in a second group of RS resource sets to be used by a subset of the multiple wireless nodes to transmit RSs;
transmit a first RS on the first RS resource set; and
transmit a second RS on the second RS resource set,
wherein a hierarchical relationship between the first RS resource set and the second RS resource set are indicated in the RS configuration signaled to the wireless node.

* * * * *